United States Patent
Thompson

[15] 3,705,642
[45] Dec. 12, 1972

[54] TRANSMISSION CONTROL SYSTEM

[72] Inventor: Charles H. Thompson, Pittsboro, Ind.

[73] Assignee: General Motors Corporation, Detroit, Mich.

[22] Filed: Feb. 12, 1971

[21] Appl. No.: 114,986

[52] U.S. Cl. .........................192/4, 74/869, 74/720.5
[51] Int. Cl. ...............................................F16h 37/06
[58] Field of Search ............74/864, 868, 869; 192/4; B60k/21/00; F16d/67/04

[56] References Cited

UNITED STATES PATENTS 3,505,906   4/1970   Lemieux............................74/869 X
3,525,275   8/1970   Lemieux................................74/868

Primary Examiner—Arthur I. McKeon
Attorney—W. E. Finken, A. M. Heiter and R. L. Phillips

[57] ABSTRACT

There is disclosed a control system providing manual and also automatic shift control for a multispeed forward and reverse end vehicle transmission. The automatic operation is provided by pilot valves which are controlled by a pressure indicative of vehicle speed and also a pressure indicative of engine torque demand to condition shift valves to effect shifting between all of the forward drives. The manual control is provided by solenoid valve control over the bias of the shift valves to effect manual shifting with downshifting to lower speed range drives being delayed until vehicle speed is suitable for the speed range of the selected lower drive. The transmission includes a torque converter having a lockup clutch whose engagement is effected with the fluid delivery used for the selected drive engagement with the lockup clutch engagement being momentarily interrupted on shifting between certain of the forward drives by shuttle valve operation. A neutral valve whose operation is controlled by solenoid valves operates to deliver fluid to the shift valves for the drive engagements and on interruption of electrical power to its solenoid valves, operates to 15 Claims, 7 Drawing Figures

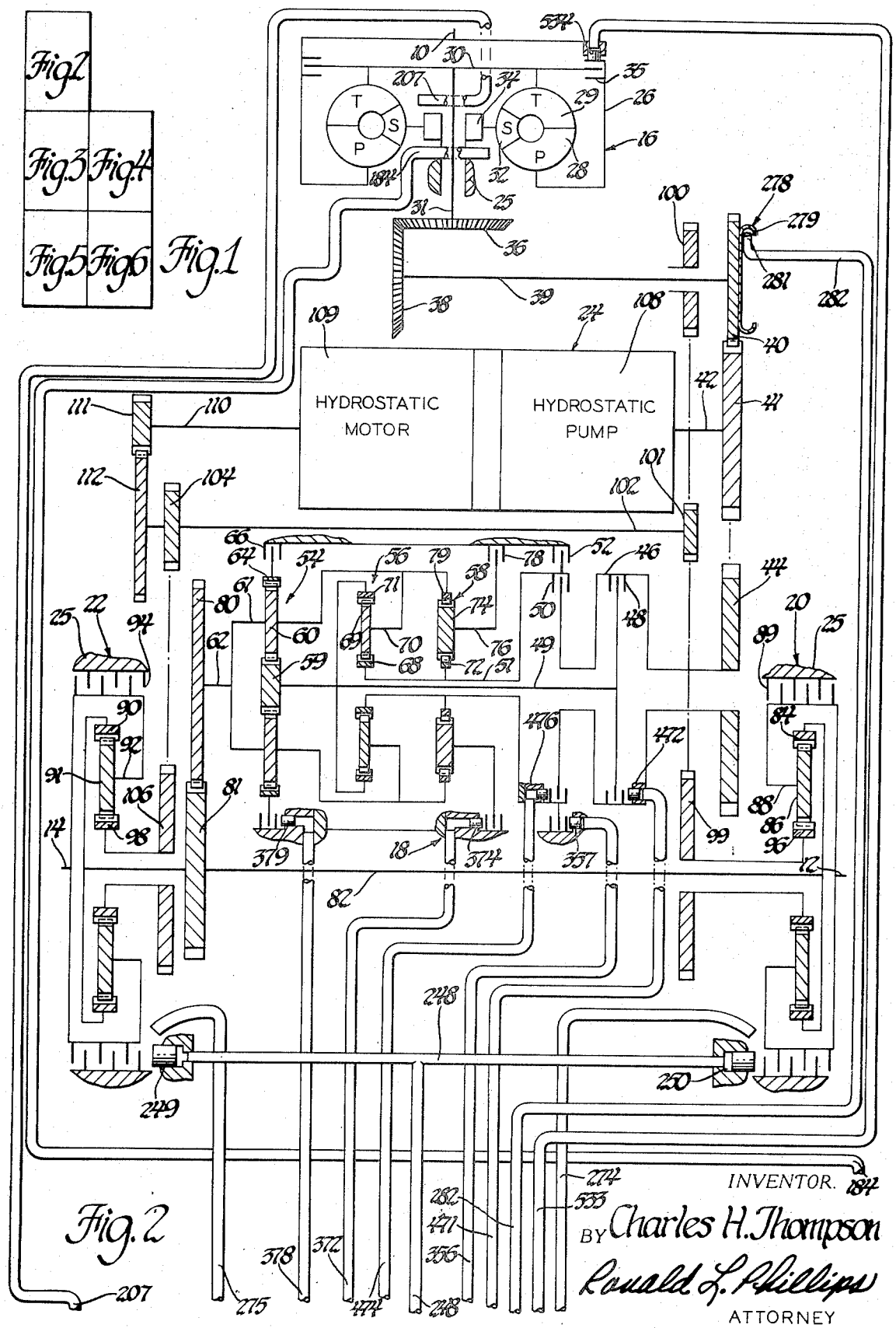

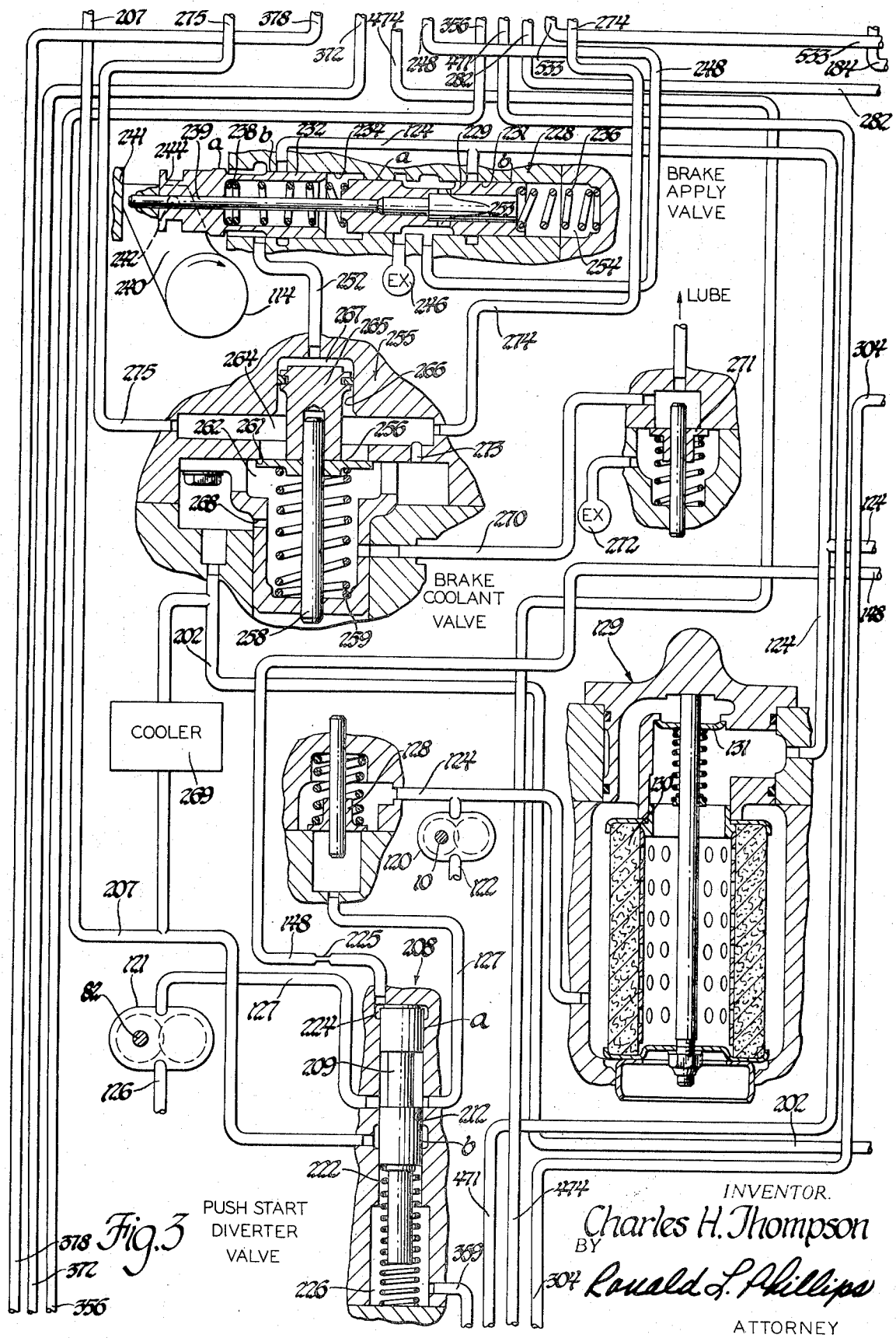

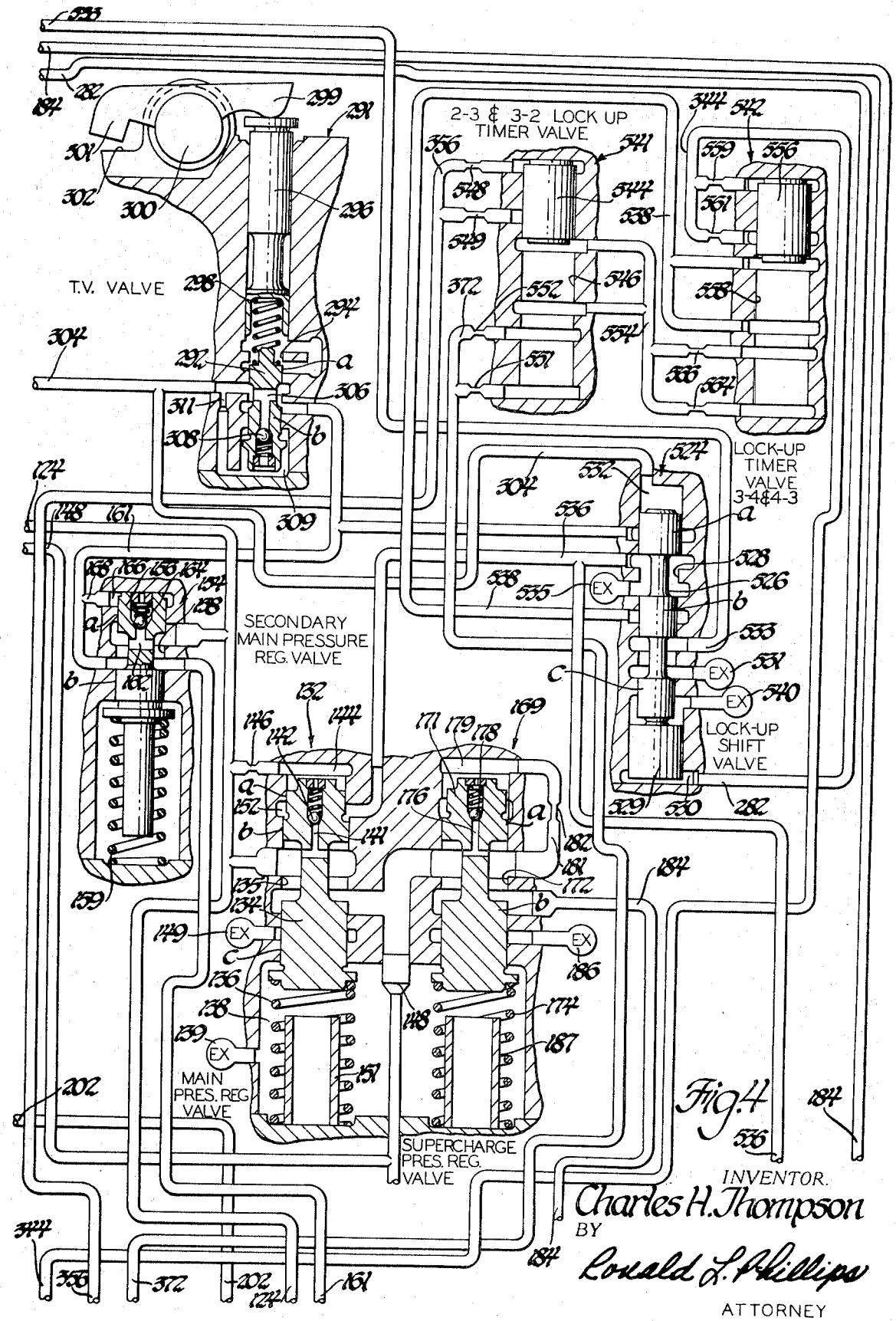

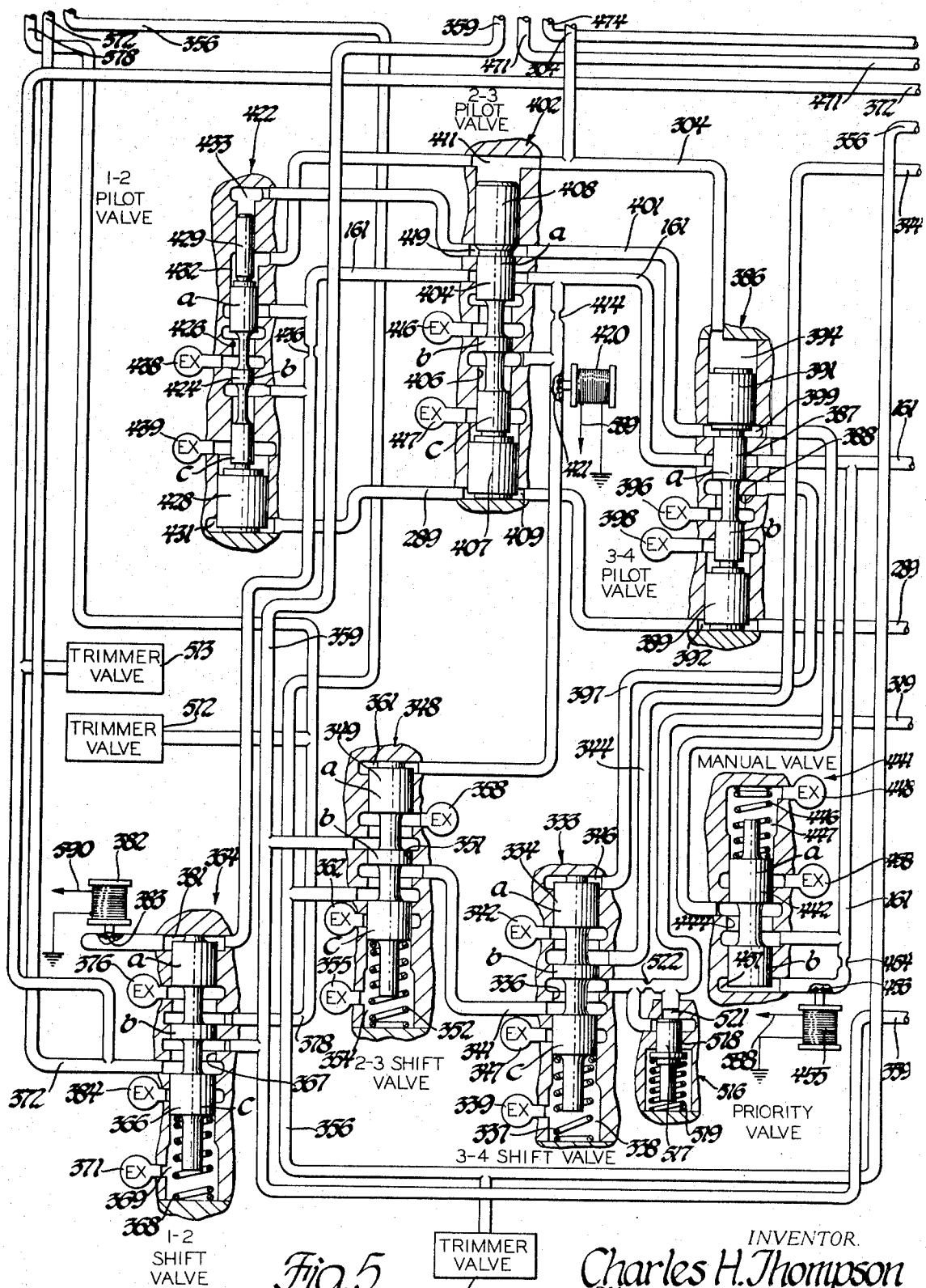

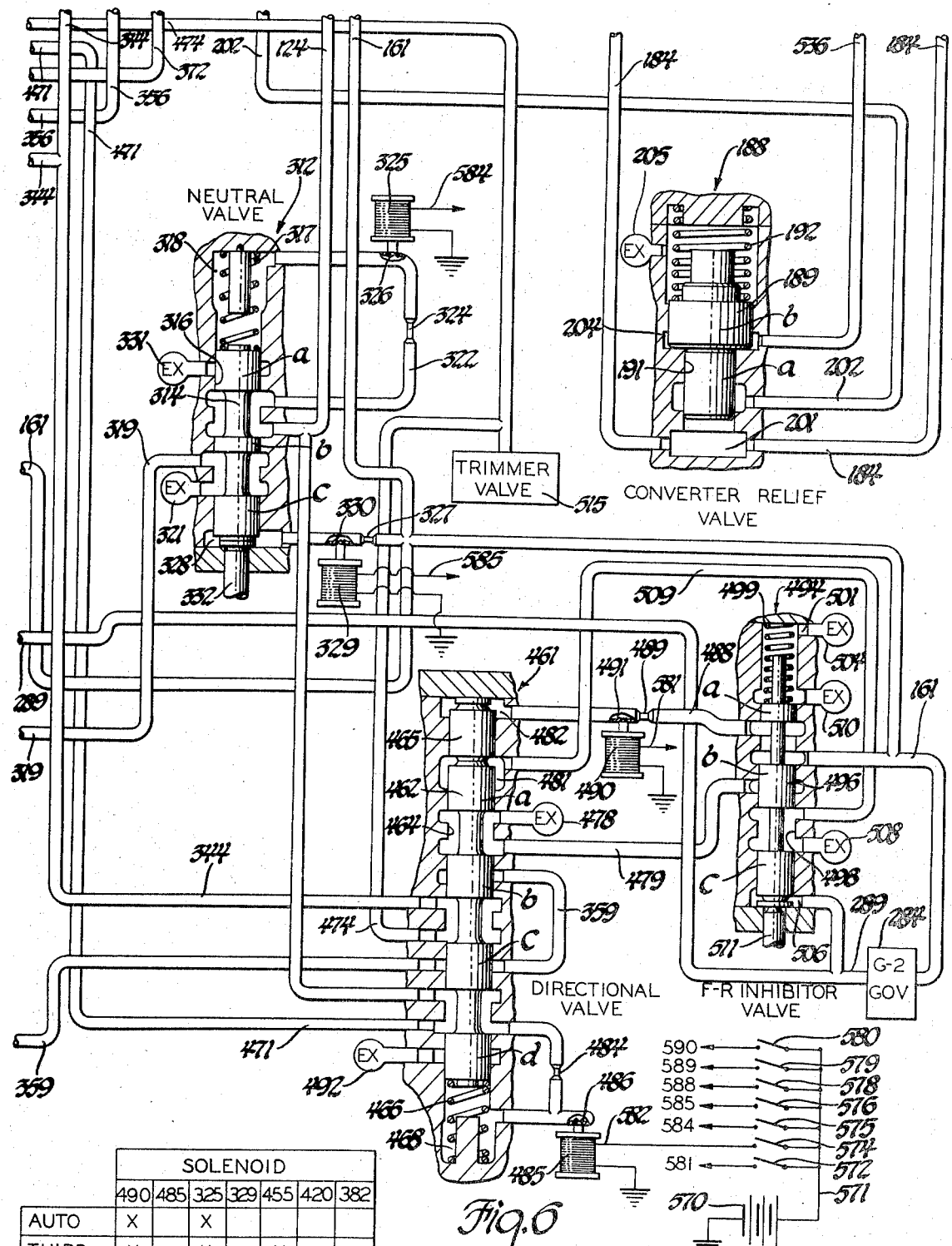

TRANSMISSION CONTROL SYSTEM

The invention herein described was made in the course of work under a contract or subcontract thereunder with the Department of the Army.

This invention relates to transmission control systems and more particularly to control systems providing manual and also automatic shift control for track-laying vehicle transmissions.

The transmission controlled by this system provides four forward drives and two reverse drives and the control system according to the present invention has provision for providing automatic control of all the forward drives and manual control of the three lowest forward speed range drives and the two reverse drives. The control system includes an input driven pump, an upstream main pressure regulator valve, a downstream secondary main pressure regulator valve and a downstream supercharge pressure regulator valve. For automatic operation, pilot valves are provided which are each biased to demand an upshift by a governor pressure indicative of vehicle speed which is opposed by a T.V. pressure that is derived from secondary main line pressure and is indicative of torque demand. The pilot valves control pressure bias chambers of spring biased shift valves to condition the shift valves to effect automatic shifting using main line pressure. The manual control of shifting between the three lowest speed range forward drives is provided by solenoid valves which operate to control the pressure bias chambers of the associated shift valves. In manual selection, a solenoid valve controlled manual valve delivers secondary main line pressure to provide a downshift bias on all of the pilot valves which effectively prevents automatic upshifts during manually selected drive operation. When manual downshifts are selected at an unsuitably high vehicle speed, governor pressure acts to hold the higher speed range pilot valve in its upshift demand position until the speed decreases to a suitable value. The fluid delivery for drive establishment is cascaded through the shift valves starting with the highest speed range drive shift valve so that the lower speed range shift valves may be shifted but do not receive fluid until the higher speed range shift valve is downshifted.

The transmission includes a lockup clutch whose engagement is made possible by the present control system in all forward drives above the lowest speed range forward drive. Automatic engagement occurs under the control of a lockup shift valve which has a governor pressure bias opposed by a T.V. pressure bias. The fluid delivery for the lockup clutch originates with the lines feeding fluid supply for engagement of the second, third and fourth forward drives and these lines are passed through a series of timer valves with one of these valves alternately shuttling during shifting to momentarily interrupt the fluid pressure delivery to the lockup clutch to effect momentary interruption of its engagement during the shifting.

A neutral valve controls the delivery of main line pressure to all of the shift valves, the neutral valve being spring biased away from a drive position to a neutral position preventing such fluid delivery and having solenoid valve controlled pressure chambers at each end for normally controlling its positioning. The neutral valve is constructed so that if there is power interruption to both of its solenoid valves, the valve is held by its spring bias in its neutral position preventing drive establishment. Alternatively, when the neutral valve is in its drive position for effecting drive establishment and on such power interruption to the solenoid valves, the neutral valve is maintained in its drive position for continued vehicle drive.

A directional valve controls the establishment of the transmission drive establishing devices effecting forward and reverse and is normally controlled by solenoid valves to control the establishment of these devices and thus determine the direction of vehicle travel. A forward-reverse inhibitor valve is controlled by governor pressure indicative of vehicle output speed to control whether the directional valve can be moved by the normal operation of its solenoid valves to determine either forward or reverse drive and thus determines whether shifting between forward and reverse can occur. The forward-reverse inhibitor valve is used to defeat shifts by the directional valve to thus prevent shifting between forward and reverse at an unsuitably high vehicle speed. In the event there is loss of power to both the solenoid valves controlling the directional valve, there is no immediate effect on the position of the directional valve so that it maintains the preselected drive direction.

A brake coolant valve provides for delivering fluid to cool the transmission's two output brakes. An output pump push start-diverter valve operates to deliver fluid from an output driven pump for main pressure supply in the two lowest speed range forward drives for push starting and diverts the fluid for output brake cooling during output brake engagement provided the input pump is supplying sufficient fluid for the system's other demands.

An object of the present invention is to provide a new and improved transmission control system.

Another object is to provide a new and improved transmission control system providing both manual and automatic shifting.

Another object is to provide a transmission control system having a manual shift control and an automatic shift control with the automatic shifting accomplished under the control of pilot valves and with solenoid valve manual overcontrol and manual downshifting prevented by the pilot valves above certain speeds.

Another object is to provide in a transmission control system a directional valve that provides for engagement of the transmissions's forward and reverse drive establishing devices and is prevented from accomplishing forward-reverse shifting by a shift inhibitor valve under the control of vehicle speed.

Another object is to provide in a transmission control system a fluid delivery valve for determining fluid delivery to establish drive under the control of solenoid valves which upon power interruption thereto do not affect preselected fluid delivery operation of the fluid delivery valve.

Another object is to provide in a transmission control system a directional valve for determining shifting between forward and reverse under the control of solenoid valves which upon power interruption thereto do not affect the preselected operation of the directional valve.

These and other objects of the present invention will be more apparent from the following description and drawings in which:

A transmission and a control system therefor according to the present invention are shown schematically in FIGS. 2, 3, 4, 5 and 6 when arranged as indicated by FIG. 1.

FIG. 7 shows the schedule of transmission operation.

TRANSMISSION ARRANGEMENT

The invention is illustrated in an arrangement controlling a track-laying vehicle transmission which is capable of providing multiple speed ranges and also hydrostatic steering operation in both forward and reverse. The transmission arrangement generally comprises a prime mover driven input shaft 10 operatively connected to drive a right and left track powering or steer-drive output shaft 12 and 14 by a hydrodynamic torque converter 16, a multispeed forward and reverse planetary gear range unit 18 and a right and left steer planetary gear unit 20 and 22 with a variable ratio hydrostatic steer unit 24 provided for effecting steer bias. All of these components are suitably supported in a housing 25 with the axes of the input shaft 10 and converter 16 arranged to extend longitudinally of the vehicle and the central axes of the components 12, 14, 18, 20, 22 and 24 arranged to extend transversely of the vehicle with the output shafts 12 and 14 axially aligned.

The transmission input shaft 10 is connected by an input drive cover 26 to pump blading 28 (P). The pump blading 28 exits to turbine blading 29 (T) which is connected by a hub 30 to a turbine or converter output shaft 31. Fluid is circulated toroidally in the converter and, as it leaves the turbine blading, it is redirected to the pump blading by stator blading 32 (S) that is grounded by a one-way brake 34 to the transmission housing 25. The converter is a three element converter of conventional design and provides torque multiplication in the conventional manner. The converter also has a lockup clutch 35 which, when engaged, provides direct mechanical drive from input shaft 10 to converter output shaft 31 bypassing the converter's hydraulic power path.

The converter output shaft 31 delivers power to both the propulsion and steer portions of the transmission arrangement and for this purpose is connected to a bevel gear 36. Gear 36 meshes with a second bevel gear 38 which is connected to the left end of a transversely arranged shaft 39. A spur gear 40 connected to the right end of shaft 39 meshes with a spur gear 41 from which power is delivered by a shaft 42 to the hydrostatic steer unit 24 and is also delivered via additional gearing to the range unit 18.

In the drive to range unit 18, gear 41 meshes a schematically shown with a spur gear 44 that is connected to a drum 46. Drum 46 may be connected by engagement of a clutch 48 to a shaft 49 and may also be connected by engagement of a clutch 50 to a sleeve shaft 51 through which shaft 49 extends. The shaft 51 may be braked by engagement of a brake 52. In the planetary gearing of range unit 18 there are three planetary gear sets 54, 56 and 58. In gear set 54, a sun gear 59 is connected to the left end of shaft 49 and meshes with pinions 60 which are carried by a carrier 61. Carrier 61 is connected to a shaft 62 that transmits the output from the range unit 18. Pinions 60 also mesh with a ring gear 64 that may be braked by engagement of a brake 66. In gear set 56, a sun gear 68 is connected to the left end of sleeve shaft 51 and meshes with pinions 69 which are carried by a carrier 70 that is connected to carrier 61 of gear set 54 and thus to the range unit output shaft 62. Pinions 69 also mesh with a ring gear 71 which is connected to shaft 49. The shaft 51 is connected to a sun gear 72 in gear set 58. Sun gear 72 meshes with pinions 74 which are carried by a carrier 76 that may be braked by engagement of a brake 78. Pinions 74 also mesh with a ring gear 79 which is connected to carriers 61 and 70 of gear sets 54 and 56, respectively, and thus to the range unit output shaft 62.

Output from range unit 18 is delivered to both the steer units 20 and 22. For this drive, a spur gear 80 is connected to the range unit output shaft 62 and meshes with a spur gear 81 that is connected to a cross-shaft 82 that is axially aligned with the two transmission output shafts 12 and 14. The cross-shaft 82 is connected at its right end to ring gear 84 of the right steer unit 20. Ring gear 84 meshes with pinions 86 which are carried by a carrier 88 that is connected to the right output shaft 12. A right vehicle brake 89 is connected to brake right output shaft 12. Similarly, the left end of cross-shaft 82 is connected to ring gear 90 of the left steer unit 22. Ring gear 90 meshes with pinions 91 which are carried by a carrier 92 that is connected to the left output shaft 14. A left vehicle brake 94 is connected to brake the left output shaft 14. Sun gear 96 meshing with pinions 86 of the right steer unit and sun gear 98 meshing with pinions 91 of the left steer unit are connected by a direction reversing gear train. This gear train has at its right end an annular spur gear 99 which is located about cross-shaft 82, is connected to sun gear 96 of the right steer unit and is in mesh as schematically shown with an idler spur gear 100 which is mounted for free rotation about shaft 39. Idler gear 100 meshes as schematically shown with a spur gear 101 which is connected to the right end of a shaft 102. A spur gear 104 connected to shaft 102 near the shaft's left end meshes as schematically shown with an annular spur gear 106 which is located about cross-shaft 82 and is connected to sun gear 98 in the left steer unit.

Steering is made available in the transmission arrangement by the hydrostatic sheer unit 24 which is converter turbine driven by the shaft 42 and is connected to drive the direction reversing gear train between the sun gears 96 and 98. In this steer drive portion of the transmission arrangement, the shaft 42 is connected to drive pump 108 of the hydrostatic steer unit 24, the pump 108 being hydraulically connected to the axially aligned hydrostatic motor 109 of this unit. The steer motor 109 is connected by a shaft 110 to a spur gear 111 which meshes with a spur gear 112 that is connected to the left end of shaft 102. Both the pump 108 and motor 109 are of conventional design with the pump having a variable displacement and the motor having either a variable or fixed displacement with speed and direction of the motor output being controlled by any suitable conventional pump displacement control mechanism as described in more detail later.

The drive producing clutches and brakes are conventional friction drive establishing devices of the friction plate type each having a suitable fluid motor with a piston which is operated by fluid pressure to effect engagement of the device. Each of these devices also has suitable retraction spring means, not shown, that operate with exhaust of the fluid pressure to return the piston to its release position. The output brakes 89 and 94 have conventional structure of the friction plate type and are hydraulically and manually operated simultaneously by conventional linkage which includes a rotary or otherwise movable member such as shaft 114 shown in FIG. 3 which shaft turns during engagement and disengagement of these brakes.

Transmission Arrangement Operation

The transmission drive train arrangement may be operated to provide four forward speed range drives, two reverse speed range drives and hydrostatically controlled steering. For neutral, all of the drive establishing devices are disengaged to disconnect all power flow paths from the output shafts 12 and 14. In addition, the hydrostatic steer unit is conditioned so as not to deliver power therethrough.

Steering is available in neutral by conditioning the hydrostatic steer unit 24 by its displacement control to drive the steer motor output shaft 110 in either direction thereby causing one of the sun gears 96 and 98 in the steer units to be driven in one direction and the other sun gear to be driven in the opposite direction at the same speed. Since the ring gears 84 and 90 are connected, they provide reaction resulting in the output shafts 12 and 14 being driven at the same speed but in opposite directions to provide a pivot steer about the vehicle's center with the direction of vehicle turning determined by the hydrostatic motor output direction. In the following operational description of the transmission drive train arrangement, the hydrostatic steer unit 24 may be considered as conditioned so that it delivers no output to the steer units 20 and 22 so that they are free of the steer drive. The description of steering operation that is available in the forward and reverse drives will follow that of the forward and reverse drive operation.

The first and lowest speed range forward drive is established by engaging the clutch 48 and brake 66 while all of the other drive establishing devices are disengaged. With power to the input shaft 10, the converter 16 drives the converter output shaft 31 and this drive is transmitted through the engaged clutch 48 to sun gear 59 of gear set 54. With brake 66 engaged, the ring gear 64 of gear set 54 is held to provide reaction to effect a simple planetary reduction drive by gear set 54 to drive shaft 62 and thus the ring gears 84 and 90 of the steer units. The sun gears 96 and 98 of the steer units by their geared connection provide reaction causing the carriers 88 and 92 and thus output shafts 12 and 14 to rotate in the same direction at a reduced speed. The direction of rotation of the output shafts 12 and 14 thus produced will be described as the forward direction since it produces forward vehicle motion.

To establish the second speed range forward drive, the brake 66 is disengaged while the brake 78 is engaged to hold carrier 76 of gear set 58 and clutch 48 remains engaged to provide drive to ring tear 71 of gear set 56. This effects a compound planetary reduction drive by the gear sets 56 and 58 to drive shaft 62 and thus output shafts 12 and 14 in a speed range higher than that provided in the first speed range forward drive.

To establish the third speed range forward drive, the brake 78 is disengaged while the brake 52 is engaged to hold sun gear 68 of gear set 56 and clutch 48 remains engaged to maintain drive to ring gear 71 of this gear set. This effects a planetary reduction drive by gear set 56 to drive shaft 62 and thus output shafts 12 and 14 in a speed range higher than that provided in the second speed range forward drive.

To establish the fourth speed range forward drive, the brake 52 is disengaged while the clutch 50 is engaged to provide drive to sun gear 68 of gear set 56 and clutch 48 remains engaged to maintain drive to ring gear 71 of this gear set. This locks up gear set 56 to provide a direct drive through the range unit to shaft 62 to drive output shafts 12 and 14 in a speed range higher than that provided in the third speed range forward drive.

To establish the first and lowest speed range reverse drive, clutch 50 is engaged to drive sun gear 68 of gear set 56 and brake 66 is engaged to hold ring gear 64 of gear set 56. This effects a compound planetary reduction drive by gear sets 54 and 56 to drive shaft 62 and thus output shafts 12 and 14 in the reverse direction.

To establish the second speed range reverse drive, the brake 66 is disengaged while the brake 78 is engaged to hold carrier 76 of gear set 58 and clutch 50 remains engaged to provide drive to sun gear 72 of this gear set. This establishes a simple planetary reduction drive by gear set 58 to drive shaft 62 and thus output shafts 12 and 14 in the reverse direction in a speed range higher than that provided in the first speed range reverse drive.

Describing now the steering operation that is available, steering of the differential type is available in all of the forward and reverse drives by control of the hydrostatic steer unit 24 to drive the motor output shaft 110 in either direction. This drives sun gears 96 and 98 of the steer units in opposite directions at the same speed to deliver an additive speed component to one of the transmission output shafts 12 and 14 while subtracting the same amount of speed from the other output shaft. The resulting speed differential between output shafts 12 and 14 effects turning of the vehicle with the direction of the turn determined by the hydrostatic motor output direction.

CONTROL SYSTEM

The control system for this track-laying vehicle transmission arrangement and according to the present invention, provides for automatic selection of the four forward drives and manual selection of the three lowest speed range forward drives and also the two reverse drives. Other functions of the control system include vehicle brake engagement, lubrication, cooling, charging of the torque converter and fluid pressure supply for the steering control.

Fluid Supply

The fluid such as oil used in all of the control functions functions is supplied by two gear-type positive displacement pumps 120 and 121 shown in FIG. 3 which draw the fluid from a reservoir that is provided in the lower portion of the transmission housing 25 to which the fluid exhausted from all parts of the system is returned. The pump 120 which will be called the input pump is drivingly connected to the transmission input shaft 10 so that it is continuously driven to supply fluid when the engine is operating. The fluid supplied by this pump furnishes the main fluid supply for the control system. The pump 121 which will be called the output pump is drivingly connected to shaft 82 so that it is driven to supply fluid when the vehicle is moving forwardly and the engine is not running. The fluid supplied by the output pump 121 supplements the fluid supply from the input pump 120 during forward drive operation and is the only source of main pressure supply when the input pump is not operating. The output pump 121 also provides fluid supply to cool the vehicle brakes and also for lubrication.

Main Pressure Regulator Valve

The input pump 120 draws fluid from the transmission's reservoir or sump via an intake line 122 and delivers this fluid to a main line 124. The output pump 121 draws fluid from the transmissions's reservoir via an intake line 126 and delivers the fluid via a line 127 to a spring biased check valve 128 which is normally closed. The check valve 128 when opened by output pump pressure, connects the line 127 and thus pump 121 to deliver fluid to the main line 124 for push starting, for example. The fluid delivered to main line 124 from these pumps is passed through a filter 129 prior to flowing to all the downstream portions of the control system. The filter 129 includes a filtering media 130 for filtering the fluid as it passes through and further includes a spring biased bypass valve 131 which opens in the event the filter accumulates excessive foreign material to provide a bypass passage for the fluid around the filtering media 130.

The main pressure supply for the control system is regulated in main line 124 by a main pressure regulator valve 132 shown in FIG. 4. The main pressure regulator valve 132 has a regulator valve element 134 having lands $a$, $b$ and $c$ located in a stepped bore 135 of the system's valve body. The spaced lands $b$ and $c$ of valve element 134 have the same diameter and land $a$ is adjacent to and has a slightly smaller diameter than that of land $b$. Regulator valve element 134 is biased upward by a spring 136 which is located in a chamber 138 that is exhausted by exhaust port 139. The main line 124 is always connected to the bore 135 in the space between lands $b$ and $c$. This space is in turn always connected to a passage 141 in regulator valve element 134 which passage has a spring loaded check valve 142 therein permitting fluid flow from the main line 124 to a chamber 144 at the closed upper end of valve bore 135. The main line 124 is also connected through a flow restriction 146 to the chamber 144. The pressure of the fluid admitted to chamber 144 from main line 124 acts on the exposed end area of land $a$ to urge the valve element 134 downward to connect the main line 124 between lands $b$ and $c$ first to a hydrostatic supercharge supply line 148 and then to an exhaust port 149 on further movement in the event of excessive pressure surge. The downward movement of the valve element 134 is limited by a sleeve 151. Thus, the valve 132 regulates the pressure in main line 124 according to the bias provided by spring 136 with the check valve 142 in cooperation with the flow restriction 146 controlling and damping the action of the regulator valve.

The main pressure which is used to operate the converter lockup clutch 35 as described in more detail later is decreased during converter lockup operation, such pressure decrease being permissible since low torque at higher rotating speeds is being transmitted through the transmission. The decrease in regulated main line pressure is provided by a chamber 152 which exposes the differential area between lands $a$ and $b$ of regulator valve element 134. When fluid pressure indicating converter lockup clutch operation is delivered to chamber 152 as described in more detail later, such pressure acts downward on the unbalanced area of land $b$ of the regulator valve element 134 to decrease main line pressure.

Secondary Main Pressure Regulator Valve

Main line 124 is also connected to a secondary main pressure regulator valve 154 which is shown in FIG. 4. Valve 154 has a regulator valve element 156 having spaced lands $a$ and $b$ of equal diameter located in a bore 158 in the valve body. The valve element 156 is biased to an open position as shown by a spring 159. A secondary main line 161 is always connected between lands $a$ and $b$ to a passage 162 in the valve element 156 which passage has a spring loaded check valve 164 therein permitting flow from the secondary main line 161 to a chamber 166. Chamber 166 is at the closed upper end of bore 158 and exposes the end area of land $a$. The secondary main line 161 is also connected through a flow restriction 168 to chamber 166. The pressure of the fluid in chamber 166 acts downward on the end of land $a$ to bias the valve element 156 downward against the bias of spring 159 to close the connection between the secondary main line 161 and the main line 124 and thus the valve regulates the pressure in the secondary main line 161 in accordance with the spring bias with the check valve 164 in cooperation with the flow restriction 168 controlling and damping the regulator action. Since the valve 154 is thus a downstream regulator valve, the pressure in the secondary main line 161 will not fluctuate when the pressure in main line 124 fluctuates.

Supercharge Pressure Regulator Valve

The pressure of the fluid in the hydrostatic supercharge supply line 148 which is fed with the overage from the main pressure regulator valve 132 as described previously is regulated by a supercharge pressure regulator valve 169. The supercharge pressure regulator valve 169 operates on the pressure in line 148 to provide a regulated supply pressure for the hydrostatic steer unit 24. The valve 169 has a regulator valve element 171 which has spaced lands $a$ and $b$ of equal diameter located in a bore 172 of the valve body and is biased upward by a spring 174. The line 148 is always connected to the space between lands $a$ and $b$ and this space is always connected to a passage 176 in the valve element which passage has a spring loaded check valve 178 therein permitting fluid flow from line 148 to a chamber 179 at the closed upper end of valve bore 172.

The space between lands a and b is also always connected through a line 181 having a flow restriction 182 therein to chamber 179. The pressure of fluid admitted to chamber 179 acts on the end of land a against the bias of spring 174 to urge valve element 171 downward to connect line 148 between lands a and b first to a converter supply line 184 and then to an exhaust port 186 in the event there is excessive pressure surge. Downward movement of valve element 171 is limited by a sleeve 187. Thus, the pressure of the fluid in the hydrostatic supercharge supply line 148 is regulated according to the bias of spring 174 with the check valve 178 and flow restriction 182 cooperating to control and dampen the regulator action.

The fluid in the hydrostatic supercharge supply line 148 is used to supply the hydrostatic steer unit 24. The hydrostatic steer unit control system may be of the type disclosed in U.S. Pat. application Ser. No. 779,502, now U.S. Pat. No. 3,640,157 filed Nov. 27, 1968, and entitled "Power Train Control System" by Robert H. Schaefer. Reference may be made to the aforementioned Schaefer patent application for further details on the hydro-static steer drive control.

Converter Relief Valve

The converter supply line 184 which is supplied by overage from the supercharge pressure regulator valve 169 is connected to deliver fluid to a converter relief valve 188 shown in FIG. 6. The valve 188 comprises a valve element 189 having a land a and a larger diameter land b located in a stepped bore 191 in the valve body. A spring 192 located in the closed upper end of valve bore 191 biases valve element 189 downward to the position shown which is determined by the lower shoulder of land b abutting the step in the valve bore. The lower end of bore 191 is closed to provide chamber 201 which is connected to the converter supply line 184 and with fluid admitted to chamber 201, the pressure of this fluid acts upward on valve element 189. When the pressure bias on valve element 189 exceeds the bias of spring 192 the valve element 189 is moved upward to connect chamber 201 to a converter bypass line 202 which delivers fluid for lubrication or to cool the brakes as described in more detail later. Thus, the pressure in the converter supply line 184 cannot exceed a value determined by the bias of spring 192. A chamber 204 exposes the differential area between lands a and b of valve element 189. When fluid pressure indicating converter clutch lockup operation is delivered to chamber 204 as described in more detail later, such pressure acts upward on the unbalanced area of land b to urge valve element 189 upward against the bias of spring 192 thereby reducing the effective downward bias on valve element 189 and thus reducing the pressure in the converter supply line 184. An exhaust port 205 exhausts the closed upper end of bore 191. The converter supply line 184 is connected to supply fluid to the torque converter 16 as shown in FIG. 2 with the fluid being directed from the converter to the system's reservoir via a converter return line 207.

Push Start-Diverter Valve

A push start-diverter valve 208 shown in FIG. 3 operates to divert fluid from the output pump 121 to cool the output brakes 89 and 94. The valve 208 comprises a spool valve element 209 having spaced lands a and b of equal diameter located in a bore 212 in the valve body. A spring 222 normally holds valve element 209 in a push start position as shown in which the output pump delivery line 127 is blocked from the converter return line 207 by land b while the line 127 is open between lands a and b to deliver fluid to the main line 124 via the check valve 128. The upper end of bore 212 is closed to provide a chamber 224 which is connected to the hydrostatic supercharge supply line 148 through a flow restriction 225. When hydrostatic supercharge pressure is at its normal regulated value, this pressure acting in chamber 224 on the upper end of valve element 209 is effective to move this valve element downward to a divert position in which the output pump delivery line 127 is connected between lands a and b to the converter return line 207. When main pressure is made available to a chamber 226 as described in more detail later, the fluid pressure acting in this chamber acts upward on valve element 209 and thus assists the spring 222 in holding the valve element 209 in its push start position Brake Apply Valve A brake apply valve 228 shown in FIG. 3 controls the engagement of the output brakes 89 and 94 and comprises a spool valve element 229 having spaced lands a and b of equal diameter located in a valve bore 231. The brake apply valve further comprises a spool valve element 232 having spaced lands a and b of equal diameter located in an enlarged diameter portion 234 of bore 231, the lands on valve element 232 being larger in diameter than the lands on valve element 229. A spring 236 biases valve element 229 leftward while a regulator spring 238 located between the valve elements 229 and 232 urges the valve elements apart with such movement being limited by a rod 239. A lever 240 is connected to the brake linkage shaft 114 and thus pivots when the output brakes are applied on clockwise rotation of shaft 114. Lever 240 is engageable with a stop 241 in a brake release position as shown and has a pin 242 which engages an annular channel 244 near the left end of valve element 232 where it extends out of the large diameter bore portion 234. When the lever 240 is against stop 241, the valve elements 232 and 229 are positioned as shown with land b of valve element 229 blocking a branch of the main line 124 at the bore 231 while an exhaust port 246 is connected between lands a and b of valve element 229 to a vehicle brake feed line 248. The vehicle brake feed line 248 is connected to fluid pressure operated motors 249 and 250 which operate the output brakes 94 and 89, respectively. Also in the brake release position, the land b of valve element 232 blocks another branch of the main line 124 while a coolant signal line 252 is connected between lands a and b of this valve element to exhaust through the left end of the large diameter bore portion 234.

When the brake linkage shaft 114 and thus lever 240 are rotated clockwise as viewed in FIG. 3, the bias of spring 236 is sufficiently large enough to hold valve element 229 in position while valve element 232 moves rightward relative to the valve element 229 to connect the main line 124 between lands a and b to the coolant signal line 252. Then on continued brake apply movement, the rightward pushing force overcomes the bias of spring 236 to effect rightward movement of the valve element 229 so that its land a then blocks the exhaust port 246 while the main line 124 is then connected between lands a and b of this valve element to the vehicle brake feed line 248 to hydraulically engage the output brakes. The brake feed line 248 is connected between lands a and b of valve element 229 via ports 253 to a chamber 254. The pressure in chamber 254 acts leftward on valve element 229 against the bias of regulator spring 238 to effect regulation of the brake apply pressure. The force applied by spring 238 is proportional to brake lever movement and thus the brake apply pressure is proportional to brake lever position.

Brake Coolant Valve

A brake coolant valve 255 controls the supply of fluid to cool the output brakes 94 and 89 as these brakes are being engaged. The brake coolant valve 255 comprises a valve element 256 which is piloted on a pin 258 and is urged by a spring 259 against a valve seat 261 to prevent fluid communication through this valve opening between a chamber 262 and a chamber 264. The valve element 256 is moved downward to an open position by a piston 265 which is located in a bore 266 and is fixed to pin 258. Piston 265 is moved downward on supply of fluid pressure to a chamber 267 which is supplied with pressure by the coolant signal line 252 from the brake apply valve 228. The line 202 from the converter relief valve 188 is connected to chamber 262. In addition the converter return line 207 is connected through a cooler 269 to the chamber 262. When the brake coolant valve 255 is closed, the fluid thus supplied to chamber 262 is delivered to a lubrication supply line 270 which supplies fluid to lubricate the various parts of the transmission. The pressure of the fluid being thus delivered for lubrication is limited by a spring biased poppet type valve 271 which exhausts fluid overage to an exhaust port 272. A small portion of the fluid supplied to chamber 262 is delivered by a flow restriction 273 to chamber 264 which is connected by coolant feed lines 274 and 275 to deliver fluid to the friction surfaces of the output brakes 89 and 94, respectively. This small amount of fluid delivery when the output brakes are disengaged is to provide lubrication of these brakes' moving parts. Alternatively, when the brake apply valve 228 is operated to engage the brakes whereby fluid pressure is made available to chamber 267 on initial brake demand, the valve element 256 is moved downward by piston 265 to its open position to provide unrestricted flow communication between chambers 262 and 264 so that the fluid overage in line 202 from the converter relief valve 188 and the fluid in the converter return line 207 is made available to cool the output brakes when they are being used. During brake engagement, a flow restriction 268 delivers a small amount of fluid from lines 202 and 207 to line 270 for lubrication.

Governors

The control system has two governors providing separate speed governed pressures. These pressures are used to control different operations in the control system. One governor 278 which is of the fluid velocity type and will be called the G1 governor is shown in FIG. 2 and has an annular trough 279 that is connected to rotate with the converter turbine 29. The trough 279 is supplied with fluid from any suitable line such as from the secondary main line 161. The fluid rotating with trough 279 impinges on the open end of a stationary Pitot tube 281 to provide in a G1 line 282 a governor pressure which is proportional to converter turbine speed and will be called G1 pressure.

The other governor 284, which will be called the G2 governor, is shown in FIG. 6. The G2 governor is of a conventional type and is supplied with fluid from the secondary main line 161. The G2 governor 284 may, for example, be of the mechanical type disclosed in U.S. Pat. No. 2,762,384 issued to M. S. Rosenberger. The G2 governor 284 is driven at a speed proportional to that of the output shafts 12 and 14 to provide in a G2 line 289 a governor pressure which is proportional to vehicle speed.

Throttle Pressure Regulator Valve

A pressure indicating engine torque demand which is used for control of automatic shifting is provided by a throttle pressure regulator valve 291 which is shown in FIG. 4. Valve 291 which may also be called a T.V. valve comprises a regulator valve element 292 of the spool type having spaced lands a and b of equal diameter located in a small diameter portion of a stepped bore 294 in the valve body. The valve also has a control valve element 296 located in a large diameter portion of bore 294 and a spring 298 which is located between elements 292 and 296 to urge them apart.

The positioning of the control valve element 296 is controlled by a lever 299 which contacts the projecting upper end of this valve element and is pivoted by a pivot pin 300 on the valve body, the lever 299 being connected by suitable linkage to the engine throttle control, not shown, which controls the throttling of the vehicle's engine powering the transmission. When the engine throttle is in its zero throttle position, the opposite end 301 of lever 299 is against a stop 302 with the valve elements 292 and 296 at their maximum distance apart. At this zero engine throttle position, there is a spring loading on the regulator valve element 292 so that the secondary main line 161 is connected between lands a and b to a T.V. line 304 to establish a minimum T.V. pressure to position pilot valves as described in more detail later.

The T.V. line 304 is continuously connected to the space between lands a and b of the regulator valve element 292 and this space is connected to a passage 306 in the valve element having a spring loaded check valve 308 therein to permit flow from the T.V. line 304 to a chamber 309 at the closed lower end of the valve bore. The T.V. line 304 is also connected to chamber 309 through a flow restriction 311. The fluid pressure in chamber 309 urges valve element 292 upward to close off secondary main line 161 and thus the valve regulates to provide in the T.V. line 304 a pressure proportional to the acting spring bias of the spring 298. As the engine throttle is opened, the lever 299 is pivoted clockwise moving the control valve element 296 downward. This downward movement causes the spring 298 to provide a progressively increasing downward regulating bias and the pressure of the fluid delivered between lands *a* and *b* of regulator valve element to the T.V. line 304 increases accordingly. Since movement of the control valve element 296 is proportional to the engine throttle opening which is indicative of engine torque demand, the pressure in T.V. line 304 which will be called T.V. pressure is also proportional to engine throttle opening and indicative of engine torque demand. Thus the T.V. pressure produced in T.V. line 304 is proportional to engine throttle opening and increases with increasing throttle opening and torque demand.

Neutral Valve

The main line 124 is connected to a neutral valve 312 shown in FIG. 6 which operates to condition the transmission in neutral. The neutral valve 312 comprises a spool valve element 314 having spaced lands *a*, *b* and *c* of equal diameter located in a bore 316 of the valve body. A spring 317 which is located in a chamber 318 at the upper end of valve bore 316 normally urges the valve element 314 downward to the position shown which will be called the neutral position. In the neutral position, a range main line 319 which supplies main line pressure for engaging the different drives is connected between lands *b* and *c* to an exhaust port 321 while the main line 124 is connected between lands *a* and *b* to a signal line 322 which has a flow restriction 324 therein and is connected to chamber 318. A solenoid valve 325 is connected to line 322 between the flow restriction 324 and chamber 318 and when deenergized, is spring biased to close an exhaust port 326 so that pressure in chamber 318 builds to full main line pressure to assist spring 317 in holding the neutral valve in its neutral position. When solenoid valve 325 is energized, it opens the port 326 so that pressure is prevented from building in chamber 318 while the flow restriction 324 maintains the main line pressure upstream thereof. The secondary main line 161 is connected through a flow restriction 327 to a chamber 328 at the lower end of bore 316 so that secondary main pressure is available to urge the valve element 314 upward against the downward bias discussed above. A solenoid valve 329 is connected to secondary main line 161 between flow restriction 327 and chamber 328 and when deenergized, is spring biased to close an exhaust port 330 so that pressure in chamber 328 builds to full secondary main pressure. The upward bias provided by secondary main pressure is effective to move the valve element upward to a drive position only against the bias of spring 317 and thus is effective to move the valve element 314 to the drive position only when the solenoid valve 325 is energized to exhaust the chamber 318. In the drive position, the main line 124 is connected to the range main line 319 between lands *b* and *c* of valve element 314 while the signal line 322 is connected between lands *a* and *b* to an exhaust port 331. When solenoid valve 329 is energized, it opens the port 330 so that pressure is prevented from building in chamber 328 while the flow restriction 327 maintains the secondary main pressure upstream thereof. Thus, when solenoid valve 329 is energized the neutral valve 312 will be moved from its drive position to its neutral position and be maintained in the latter position by either the bias of spring 317 or this spring bias plus the downward pressure bias if solenoid valve 325 is deenergized. A manually movable pin 332 engageable with the lower end of valve element 314 is provided so that the vehicle operator can manually move the neutral valve 312 to its drive position where there is electrical power interruption.

3-4 Shift Valve

The range main line 319 is connected to a 3-4 shift valve 333 shown in FIG. 5 which provides for shifting between the third and fourth forward drives. The 3-4 shift valve 333 comprises a spool valve element 334 having spaced lands *a*, *b* and *c* of equal diameter located in a bore 335 of the valve body. A spring 337 is located in a chamber 338 which is continuously exhausted by a port 339 normally urges the valve element 334 upward to an upshift position as shown in which it connects the range main line 319 between lands *b* and *c* to a 2-3 shift valve feed line 341 while connecting an exhaust port 342 between lands *a* and *b* to a line 344 which is for transmitting fluid to operate the clutch 50 as described in more detail later. The 3-4 shift valve element 334 is moved downward against the spring bias to a downshift position upon delivery of sufficient fluid pressure to a chamber 346 at the closed upper end of valve bore 336, the supply of fluid pressure to chamber 346 being described in more detail later. The 3-4 shift valve 333 is the downshift position connects the range main line 319 between the lands *a* and *b* to the line 344 while the 2-3 shift valve feed line 341 is connected between lands *b* and *c* to an exhaust port 347.

2-3 Shift Valve

The 2-3 shift valve feed line 341 is connected to a 2-3 shift valve 348 shown in FIG. 5 which controls the shifting between the second and third forward drives. The 2-3 shift valve 348 comprises a spool valve element 349 having spaced lands *a*, *b* and *c* of equal diameter located in a bore 351 in the valve body. A spring 352 located in a chamber 354 at the closed lower end of bore 351, which chamber is exhausted by an exhaust port 355, biases the valve element 349 upward to an upshift position as shown in which it connects the 2-3 shift valve feed line 341 between lands *b* and *c* to a line 356. Line 356 is connected to a fluid pressure operated motor 357 that operates the brake 52 as shown in FIG. 2. In the upshift position, the b 2-3 shift valve 348 also connects an exhaust port 358 between lands *a* and *b* to a line 349 that is connected to chamber 226 of the push start-diverter valve 208 and is also connected to transmit fluid to operate the clutch 50 as described in more detail later. The valve element 349 is urged downward against the bias of spring 352 to a downshift position upon delivery of sufficient fluid pressure to a chamber 361 at the closed upper end of bore 351, this fluid pressure delivery being described in more detail later. In the downshift position, the 2-3 shift valve feed line 341 is connected between lands *a* and *b* to the line 359 while the line 356 is connected between lands *b* and *c* to an exhaust port 362.

1-2 Shift Valve

The 1-2 shift valve feed line 359 is connected to a 1-2 shift valve 364 which is shown in FIG. 5 and provides for shifting between the first and second forward drives in both forward and reverse. The 1–2 shift valve 364 comprises a spool valve element 366 having spaced lands a, b and c of equal diameter located in a bore 367 of the valve body. The valve element 366 is normally biased upward to an upshift position as shown by a spring 368 that is located in a chamber 369 at the closed lower end of bore 367 which is connected to an exhaust port 371. In the upshift position, the 1–2 shift valve feed line 359 is connected between lands b and c to a line 372 which is connected to a fluid pressure operated motor 374 which operates the brake 78 as shown in FIG. 2. In the upshift position, the shift valve element 366 also connects an exhaust port 376 between lands a and b to a line 378 which is connected to a fluid pressure operated motor 379 that operates the brake 66. The valve element 366 is urged downward against the bias of spring 368 to a downshift position upon sufficient pressure buildup in a chamber 381 at the closed upper end of valve bore 367, the supply of fluid to chamber 381 being described in detail later. Pressure buildup in chamber 381 is controlled by a solenoid valve 382 which when deenergized is spring biased to close an exhaust port 383 to permit pressure buildup in chamber 381 to effect downward movement of valve element 366 to its downshift position. Alternatively, energization of solenoid valve 382 opens port 383 so that pressure cannot build in chamber 381 to bias valve element 366 to its downshift position. In the downshift position, the line 372 is connected between lands b and c to an exhaust port 384 while the 1–2 shift valve feed line 359 is connected between lands a and b to the line 378.

3–4 Pilot Valve

A 3–4 pilot valve 386 shown in FIG. 5 controls the operation of the 3–4 shift valve 333 and comprises a spool valve element 387 having spaced lands a and b located in a bore 388 in the valve body. A governor plug 389 and a T.V. plug 391 are located in large diameter portions of bore 388 at opposite ends if the valve element 387 and are exposed at their outermost ends to a governor chamber 392 and a T.V. chamber 394, respectively. The governor chamber 392 is connected to the G2 governor line 289 and the T.V. chamber 394 is connected to the T.V. line 304. When the downward bias on this valve train provided by T.V. pressure acting in T.V. chamber 394 exceeds the oppositely acting bias provided by G2 pressure acting in governor chamber 392 the 3–4 pilot valve train is biased to a downshift demand position as shown. In the downshift demand position, an exhaust port 396 is connected between lands a and b to a 3–4 shift valve signal line 397 which is connected to chamber 346 of the 3–4 shift valve 333. Alternatively, when the governor pressure bias exceeds the T.V. pressure bias, the 3–4 pilot valve train is moved to an upshift demand position in which the secondary main line 161 is connected between lands a and b to the 3–4 shift valve signal line 397 while exhaust port 396 is blocked by land b. An exhaust port 398 is provided to exhaust leakage. A chamber 399 is connected to a manual signal line 401 and on delivery of sufficient fluid pressure thereto, there is provided a fluid pressure bias that operates on the full upper end area of land a to hold the valve element 387 in its downshift demand position, the supply of fluid pressure to line 401 and thus to chamber 399 being described in detail later. The lands a and b of valve element 387 have slightly different diameters and the bore 388 is stepped accordingly to provide a hysteresis effect that prevents valve hunting and results in a downshift speed slightly lower than the upshift speed.

2–3 Pilot Valve

The secondary main line 161 is also connected to a 2–3 pilot valve 402 shown in FIG. 5 which controls the 2–3 shift valve 348. The 2–3 pilot valve 402 comprises a spool valve element 404 having spaced lands a, b and c located in a bore 406 of the valve body. A governor plug 407 and a T.V. plug 408 are located at opposite ends of the valve element 404 in enlarged diameter portions of bore 406. The plugs 407 and 408 are exposed at their outermost ends to a governor chamber 409 and a T.V. chamber 411 which are connected to the G2 governor line 289 and T.V. line 304, respectively. When the downward bias provided by T.V. pressure acting in chamber 411 on the T.V. plug 408 exceeds the oppositely acting bias provided by governor pressure acting upward on the governor plug 407, the 2–3 pilot valve train is held in a downshift demand position as shown in which the secondary main line 161 downstream of a flow restriction 414 is blocked from an exhaust port 416 by land c. The secondary main line 161 is connected downstream of flow restriction 414 to chamber 361 of the 2–3 shift valve 348 and thus pressure is permitted to build in chamber 361 when the 2–3 pilot valve 402 is in its downshift demand position. Alternatively, when the governor pressure bias exceeds the T.V. pressure bias, the 2–3 pilot valve train arrangement is moved to an upshift demand position in which the secondary main line 161 downstream of flow restriction 414 is connected between lands b and c to the exhaust port 416 to thus prevent pressure buildup in chamber 361 of the 2–3 shift valve 348 while flow restriction 414 maintains secondary main pressure upstream thereof. An exhaust port 417 is provided to exhaust leakage. A chamber 419 which is connected to manual line 401 provides for effecting a fluid pressure bias that acts on the full end area of land a to hold the valve element 404 in its downshift demand position.

Further regarding the control of chamber 361 of the 2–3 shift valve 348, there is provided a solenoid valve 420 which when deenergized, is spring biased to close an exhaust port 421 in secondary main line 161 downstream of the flow restriction 414. Thus, when solenoid valve 420 is deenergized, pressure is permitted to build in chamber 361 of the 2–3 shift valve 348 when the 2–3 pilot valve 402 is in its downshift demand position. Alternatively, when the solenoid valve 420 is energized, the exhaust port 421 is opened to prevent pressure buildup in chamber 361 of the 2–3 shift valve 348. The lands a and b of valve element 404 have slightly different diameters and lands b and c have the same diameter and the bore 406 is stepped accordingly to provide a hysteresis effect that prevents valve hunting and results in a downshift speed slightly lower than the upshift speed.

1-2 Pilot Valve

The secondary main line 161 is also connected to a 1-2 pilot valve 422 which is shown in FIG. 5 and controls the operation of the 1-2 shift valve 364. The 1-2 pilot valve 422 comprises a spool valve element 424 having spaced lands a, b and c located in a bore 426 of the valve body. A governor plug 428 and a plug 429 are located at the opposite ends of valve element 424 in accommodating portions of bore 426. A chamber 431 exposing the outermost end of the governor plug 428 is connected to the G2 governor line 289. A T.V. chamber 432 exposing the upper end of land a of the valve element 424 is connected to the T.V. line 304. A third chamber 433 exposing the upper end of plug 429 is connected to manual signal line 401. When the downward bias on valve element 424 provided by T.V. pressure acting in chamber 432 on the end of land a exceeds the oppositely acting bias provided by G2 pressure acting in chamber 431 on the end of governor plug 428, the 1-2 pilot valve train arrangement is held in a downshift demand position as shown. In the downshift demand position, the secondary main line 161 downstream of a flow restriction 436 is blocked from an exhaust port 438. An exhaust port 439 is for exhausting any leakage. The secondary main line 161 downstream of flow restriction 436 is also connected to chamber 381 of the 1-2 shift valve 364 and thus pressure may build to bias the 1-2 shift valve to its downshift position. Alternatively, when the governor pressure bias exceeds the T.V. pressure bias, the 1-2 pilot valve train is moved upward to an upshift demand position in which the secondary main line 161 downstream of the flow restriction 436 is connected between lands b and c to the exhaust port 438. When pressure is delivered from manual signal line 401 to chamber 433, the pressure in this chamber acts downward on plug 429 to hold the valve element 424 in its downshift demand position. The lands a and b of valve element 424 have slightly different diameters and lands b and c have the same diameter and the bore 426 is stepped accordingly to provide a hysteresis effect that prevents valve hunting and results in a downshift speed slightly lower than the upshift speed.

Manual Select Valve

The secondary main line 161 is also connected to a manual select valve 441 which is shown in FIG. 5 and provides for manual selection of the first, second and third forward drives. The manual valve 441 comprises a spool valve element 442 having spaced lands a and b of equal diameter located in a bore 444 in the valve body. A spring 446 which is located in a chamber 447 that is exhausted by an exhaust port 448 biases the valve element 442 downward to the position shown which will be called the manual select position. In this position, the secondary main line 161 is connected between lands a and b to the manual signal line 401 which is connected to the chambers 399, 419 and 433 of the 3-4, 2-3 and 1-2 pilot valves 386, 402 and 422, respectively. A chamber 451 at the closed lower end of bore 444 is connected through a flow restriction 454 to the secondary main line 161. A solenoid valve 455 when deenergized is spring biased to close an exhaust port 456 provided in the secondary main line 161 between the flow restriction 454 and chamber 451 to thus permit pressure buildup in the chamber 451. On such pressure buildup, the valve element 442 is moved upward against the bias of spring 446 to a manual shut-off position to connect the manual signal line 401 between lands a and b to an exhaust port 458 while the secondary main line 161 is blocked by land b. Alternatively, when the solenoid valve 455 is energized, it opens the exhaust port 456 to prevent pressure buildup in chamber 451 to permit the spring 446 to return the valve element 442 to its manual select position.

Directional Valve

A directional valve 461 shown in FIG. 6 controls whether a forward or reverse drive is engaged and thus determines the direction of vehicle travel. Valve 461 comprises a spool valve element 462 having spaced lands a, b, c and d of equal diameter located in a bore 464 of the valve body. A plug 465 is also located in bore 464 above valve element 462. A spring 466 located in a chamber 468 at the closed lower end of bore 464 urges valve element 462 and plug 465 upward to a forward drive position as shown. In the forward drive position, the main line 124 is connected between lands c and d to a line 471 which is connected to a fluid pressure operated motor 472 shown in FIG. 2 that operates the clutch 48. The directional valve in the forward drive position also connects the line 344 from the 3-4 shift valve 333 to a line 474 which is connected as shown in FIG. 2 to a fluid pressure operated motor 476 that operates the clutch 50. The directional valve 461 in the forward drive position also connects an exhaust port 478 between lands a and b to a line 479 while land b blocks the line 359 which is ported around land c and is connected to both the 1-2 shift valve 364 and the push start-diverter valve 208. Positioning of the directional valve is controlled by fluid pressure supplied to the chamber 468 and also to chambers 481 and 842 which are exposed to the upper ends of valve element 462 and 465, respectively. The chamber 468 is connected to the line 471 through a flow restriction 484. A solenoid valve 485, when deenergized, is spring biased to close an exhaust port 486 connected to line 471 between flow restriction 484 and chamber 468 to permit pressure buildup in this chamber. Alternatively, when solenoid valve 485 is energized, it opens the exhaust port 486 to prevent pressure buildup in chamber 468. The chamber 482 is connected by a line 488 having a flow restriction 489 therein to receive secondary main pressure as described in more detail later. A solenoid valve 490, when deenergized, closes an exhaust port 491 connected to line 488 between chamber 482 and flow restriction 489 to permit pressure buildup in chamber 482. Alternatively, when solenoid valve 490 is energized, it opens the exhaust port 491 to prevent pressure buildup in chamber 482. Whenever pressure builds in either chamber 481 or 482 and there is no pressure buildup in chamber 468, the directional valve train is moved downward to a reverse drive position against the bias of spring 466. In the reverse drive position, the line 479 is then connected between lands a and b to the line 359 which is then connected between lands b and c to the line 474 that feeds fluid to engage clutch 50 while the line 471 is connected between lands c and d to an exhaust port 492. When there is pressure buildup in chamber 468 and in either one of the chambers 481 and 482, the directional valve 461 is moved to the forward drive position by the spring bias.

Forward-Reverse Inhibitor Valve

A forward-reverse inhibitor valve 494 shown in FIG. 6 inhibits or prevents shifting between forward and reverse drive above a certain vehicle speed. The valve 494 comprises a spool valve element 496 having spaced lands a, b and c of equal diameter located in a bore 498 in the valve body. The valve element 496 is biased downward to a shift-permit position as shown by a spring 499 which is located in a chamber 501 that is exhausted by an exhaust port 504. The valve element 496 is biased upward to a shift-prevent or inhibit position by G2 pressure which is delivered by connection of the G2 line 289 to a chamber 506 where pressure acts upward on the lower end of valve element 496. In the shift-permit position, the secondary main line 161 is connected between lands a and b to line 488, the line 479 connected to the directional valve 461 is blocked by land b and an exhaust port 508 is connected between lands b and c to a line 509 which is connected to chamber 481 of the directional valve 461. When the governor pressure bias exceeds the spring bias, the valve element 496 is moved to the shift-inhibit position in which the line 488 is connected between lands a and b to an exhaust port 510, the secondary main line 161 is blocked by land b and the lines 479 and 509 are connected between lands b and c. A manually movable pin 511 engageable with the lower end of valve element 496 is provided so that the vehicle operator can manually condition the forward-reverse inhibitor valve 494 in its shift-prevent position against the bias of spring 499.

Trimmer Valves

Conventional trimmer valves 512, 513, 514 and 515 are connected to the lines 378, 372, 356 and 474 which deliver fluid to engage brake 66, brake 78, brake 52 and clutch 48, respectively. These trimmer valves may be of the type shown in U.S. Pat. No. 3,207,182 issued to J. O. Edmunds. On supply of fluid to engage the respective drive establishing devices, the associated trimmer valve operates to first regulate the pressure of the fluid supplied at a low value and then gradually regulates the pressure at higher values with increasing time until full main line pressure is reached at which time the trimmer valve then ceases to operate, such trimmer valve operation providing the gradually increasing pressure for smooth drive engagement.

Priority Valve

A priority valve 516 shown in FIG. 5 assures maintenance of the drive direction during shifting when there is trimmer valve operation and comprises a valve element 517 which is mounted in a bore 518 in the valve body and is biased by a spring 519 to close a branch 521 in the range main line 319 between the neutral valve 312 and all of the shift valves. In this closed valve position, fluid flowing through range main line 319 to the shift valves is required to pass through a flow restriction 522. Alternatively, when the pressure in the range main line 319 upstream of flow restriction 522 is high enough to move the valve element 517 downward against the bias of spring 519, the branch 521 is opened permitting free fluid flow to the shift valves.

Lockup Shift Valve

A lockup shift valve 524 shown in FIG. 4 controls the engagement of the converter lockup clutch 35. The lockup shift valve 524 comprises a spool valve element 526 having spaced lands a, b and c located in a bore 528 of the valve body. The valve 524 further includes a governor plug 529 which is located in an enlarged diameter portion of bore 528 and is exposed at its lower end to a chamber 530 which is connected to the G1 governor line 282. At the other closed end of bore 528 there is provided a chamber 532 which is connected to the T.V. line 304. When the downward bias on valve element 526 provided by T.V. pressure acting in chamber 532 exceeds the governor pressure bias provided by G1 governor pressure acting upward in chamber 530 on governor plug 529, the lockup shift valve train is held in a lockup clutch disengage position as shown. In the disengage position, an exhaust port 531 is connected between lands b and c to a line 533 which is connected as shown in FIG. 2 to a fluid pressure operated motor 534 that operates the converter lockup clutch 35. The lockup shift valve 524 in the lockup disengage position also connects an exhaust port 535 between lands a and b to a line 536 which is connected to chamber 204 of the converter relief valve 188, the line 536 also being connected to chamber 152 of the main pressure regulator valve 132.

When the G1 governor pressure bias exceeds the T.V. pressure bias, the lockup shift valve 524 is moved upward to a lockup clutch engage position in which the line 533 to the converter lockup clutch motor 534 is connected between lands b and c to a line 538 which supplies fluid pressure to this valve for the converter lockup clutch engagement as described in more detail later. Also in the converter lockup engage position, the secondary main line 161 is connected between lands a and b to the line 536 so that pressure is available to chamber 204 of the converter relief valve 188 to reduce converter inlet pressure and is also made available to chamber 152 of the main pressure regulator valve 132 to reduce main line pressure. An exhaust port 540 is for exhausting leakage. The lands a and b of valve element 526 have slightly different diameters and lands b and c have equal diameters with the bore 528 stepped accordingly to provide a hysteresis effect to prevent valve hunting.

Lockup Timer Valves

Two lockup timer valves 541 and 542 shown in FIG. 4 provide for momentarily interrupting converter lockup clutch engagement during shifting between the three highest speed range forward drives. The lockup timer valve 541 which may also be called the 2–3 and 3–2 lockup timer valve since it operates on an upshift from the second to the third forward drive and also on a downshift from the third to the second forward drive, comprises a cylindrical valve element 544 located in a bore 546 which is closed at both ends. The line 356 which transmits fluid to operate brake 52 is connected through a flow restriction 548 to the upper end of bore 546 and is also connected to this bore through another flow restriction 549 at a point spaced therealong less than the length of the valve element 544. The line 372 which transmits fluid to operate the brake 78 is connected through a flow restriction 551 to the opposite end of bore 546 and is also connected through another flow restriction 552 to the bore at a point spaced less than the length of valve element 544. The length of bore 546 in comparison to the length of valve element 544 is such that a line 554 is connected to the bore at two spaced points with one point being just below the valve element 544 when the valve element is in the position shown and the other point is just above the valve element 544 when the valve element is at the opposite end of bore 546. Assuming initial fluid pressure supply to line 356 while line 372 is being exhausted and with valve element 544 in the position shown, the pressure of the fluid admitted through the flow restriction 548 will force the valve element 544 downward toward the opposite end of bore 546. During such downward movement the valve element 544 will open the line 356 to the bore 546 through the flow restriction 549 to accelerate movement and then provide for connection of the line 356 through both of the flow restrictions 548 and 549 for normal flow to first one branch and then both branches of the line 554. Alternatively, when the valve element 544 is in the lower position and on initial fluid delivery to line 372 and then through flow restriction 551 while line 356 is being exhausted, the pressure then acting on the lower end of valve element 544 will force the valve element upward to the position shown. During such upward movement the valve element 544 will open the line 372 to bore 546 through flow restriction 552 to accelerate movement and then provide for connection of the line 372 through both of the flow restrictions 551 and 552 for normal flow to first one branch and then both branches of line 554.

The other lockup timer valve 542 which may be called the 3–4 and 4–3 lockup timer valve because of its operation, comprises a cylindrical valve element 556 that is located in a bore 558 in the valve body which bore is closed at both ends. The line 344 which supplies fluid to engage the clutch 50 is connected through a flow restriction 559 to the closed upper end of bore 558 and is also connected through another flow restriction 561 to this bore at a point located at a distance from the closed upper end of the bore less than the length of the valve element 556. The line 554 from the lockup timer valve 541 is connected through a flow restriction 564 to the closed lower end of bore 558 and is also connected through another flow restriction 566 to this bore at a point located at a distance from the closed lower end of bore 558 less than the length of valve element 556. The line 538 which leads to the lockup shift valve 524 is connected to bore 558 at two spaced points with one point being just below valve element 556 when this valve element is in the position shown and the other point being just above this valve element when the valve element is at the opposite end of this bore. When the valve element 556 is in the position shown and on initial fluid supply to the line 344 while line 554 is being exhausted, the pressure of the fluid supplied through flow restriction 559 to the upper end of bore 558 acts on the upper end of valve element 556 to urge this valve element downward toward the opposite end of the bore. As valve element 556 moves downward, it opens line 344 to bore 558 through flow restriction 561 to accelerate movement and then provides for connection of the line 344 through both of the flow restrictions 559 and 561 for normal flow to first the one branch and then both branches of line 538. Alternatively, when the valve element 556 is at the lower end of bore 558 and then on initial fluid supply to line 554 while line 344 is being exhausted, the fluid supplied through the flow restriction 564 initiates upward movement of the valve element 556 with such movement being accelerated on opening of line 554 to bore 558 through the flow restriction 556. On continued movement of valve element 556 to the position shown, the line 554 is connected through both flow restrictions 564 and 566 to one and then both branches of the line 538 which supplies the lockup shift valve 524.

Operator's Controls

The operator's controls for controlling the control system comprises a bank of switches shown in FIG. 6 which are located in the operator compartment of the vehicle remote from the power train. A suitable DC power source 570 is connected to a power line 571 which is connected to the input side of switches 572, 574, 575, 576, 578, 579 and 580 which are all normally open. When switch 572 is closed, it transmits power to line 581 that is connected to solenoid valve 490. When switch 574 is closed, it supplies power to a line 582 that is connected to solenoid valve 485. When switch 575 is closed, it supplies power to a line 584 that is connected to solenoid valve 325. When switch 576 is closed, it supplies power to a line 585 that is connected to solenoid valve 329. When switch 578 is closed, it supplies power to a line 588 that is connected to solenoid valve 455. When switch 579 is closed, it supplies power to a line 589 that is connected to solenoid valve 420. When switch 580 is closed, it supplies power to a line 590 that is connected to solenoid valve 382. The switches may be operated directly by the operator or may be operated by any suitable linkage to close the switches to provide the schedule of solenoid valve operation shown in FIG. 7. This schedule effects conditioning of the transmission in neutral, the first, second and third forward drives, automatic drive and the two reverse drives.

TRANSMISSION CONTROL OPERATION

The control system described above is operable to provide automatic shifting between all of the forward drives and also to provide manual shifting between the three lowest speed range forward drives and the two reverse drives. The schedule of operation available is shown in FIG. 7 with the letter X denoting which solenoid valves are energized in each operation Neutral For neutral, the vehicle operator closes the switch 576 to energize the solenoid valve 329 which controls the neutral valve 312 and also closes the switch 574 to energize the solenoid valve 485 which controls the directional valve 461. When the engine is started, the input pump 120 supplies fluid to main line 124 where it passes through the filter 129 before being delivered to the main pressure regulator valve 132, the secondary main pressure regulator valve 154, the neutral valve 312, the directional valve 461 and the brake apply valve 228. The secondary main pressure regulator valve 154 delivers fluid to the secondary main line 161 which directs the flow it receives to the T.V. valve 291, the lockup shift valve 524, the neutral valve 312, the forward-reverse inhibitor valve 484, the manual valve 441, all of the pilot valves 386, 402 and 422, the 2-3 shift valve 348 and the 1-2 shift valve 364. Since the vehicle is at rest, there is no G1 pressure provided to the G1 line 282 and thus the lockup shift valve 524 will be held in its release position with delivery of T.V. pressure to the T.V. line 304 from the T.V. valve 291. Thus, the lockup clutch motor 534 is exhausted by the lockup shift valve 524 so that the lockup clutch 35 is disengaged and no lockup signal pressure is delivered to the line 536 from the secondary main line 161 so that the main pressure regulator valve 132 regulates the main pressure in main line 124 at the high value. At the neutral valve 312, with the solenoid valve 329 energized and thus open while this valve's other solenoid valve 325 is deenergized and thus closed, the fluid delivered to chamber 328 of this valve is prevented from building to secondary main line pressure while main line pressure is delivered to the other chamber 318 where it builds to its full value to aid spring 317 in holding the neutral valve in its neutral position as shown. Thus, main line pressure is prevented from being delivered to the range main line 319 and thus the downstream shift valves 333, 348 and 364, the range main line 319 then being connected to exhaust port 321. At the directional valve 461 with the solenoid valve 485 energized and thus open while this other valve's solenoid valve 490 is deenergized and thus closed, fluid pressure cannot build in chamber 468 but does build in chamber 482 to full main line pressure to effect movement of the directional valve against its spring bias to the reverse drive position. Fluid in secondary main line 161 is directed to chamber 482 by the forward-reverse inhibitor valve 494 which is held in its shift-permit position by the spring 499 since there is no G2 pressure with the vehicle at rest. The other reverse drive bias chamber 481 is exhausted by the exhaust port 508 of the ford-reverse inhibitor valve 494. With the directional valve 461 thus in its reverse drive position, the clutch 48 is disengaged because of this valve condition and the clutch 50 is disengaged since there is no fluid supply to the 1-2 shift valve feed line 359.

At the manual valve 441, the fluid delivered to chamber 451 by the secondary main line 161 builds to full secondary main line pressure since the solenoid valve 455 is deenergized and thus the manual valve moves against its spring bias to its cutoff or blocking position in which it prevents delivery of secondary main line pressure to line 401 and thus to downstream pilot valves 386, 402 and 422 and instead connects line 401 to exhaust port 458. Thus, all of the pilot valves 386, 402 and 422 will be in their downshift demand positions since the downshift demand T.V. bias will exceed the G2 pressure bias as long as there is no vehicle speed and on engine throttle opening.

At the 1-2 shift valve 364 with the solenoid valve 382 deenergized and thus closed, pressure builds the chamber 381 to full secondary main line pressure to urge the 1-2 shift valve to its downshift position against the bias of spring 368. At the 2-3 shift valve 348, with the solenoid valve 420 deenergized and thus closed, pressure builds in chamber 361 to full secondary main line pressure to hold the 2-3 shift valve in its downshift position against the bias of spring 352 and thereby provides for connection to the 2-3 shift valve feed line 341 to the 1-2 shift valve feed line 359. At the 3-4 shift valve 333, the chamber 346 is exhausted so that the bias of spring 337 holds the 3-4 shift valve in its downshift position providing connection of the then exhausted range main line 319 to the 2-3 shift valve feed line 341. Thus, all drive establishing devices are disengaged so that no drive is transmitted to the transmission's output shafts 12 and 14.

The pressure of the fluid delivered by the main pressure regulator valve 132 to the hydrostatic supercharge supply line 148 is regulated by the supercharge pressure regulator valve 169 to a value suitable for the hydrostatic steer unit's control system which forms no part of this invention. The pressure of the fluid delivered to the converter supply line 184 limited to a high value by the converter relief valve 188 since there is no lockup engagement signal pressure being delivered to chamber 204 by the lockup shift valve 524. Fluid leaving the torque converter via the converter return line 207 is directed to the push start-diverter valve 208 and is also directed through the cooler 269 to the brake coolant valve 255. When converter inlet pressure tends to exceed the aforementioned high value the converter relief valve 188 will deliver fluid to the line 202 which is connected by line 207 downstream of cooler 269 to the brake coolant valve 255. With the output brake disengaged, the brake coolant valve 255 is positioned in the position shown so that only a small amount of fluid is delivered to the lines 274 and 275 to provide lubrication of the output brakes while the remaining major portion of the fluid is delivered by line 270 to lubricate the other transmission components with the pressure of such lubrication being limited by the valve 271. When pressure in the hydrostatic supercharge supply line 148 has reached its normal regulated value, this pressure acting in chamber 224 of the push start-diverter valve 208 is sufficient to move this valve to its flow diverting position so that the output pump 121 which is not yet operating since the vehicle is at rest is connected to the converter return line 207 upstream of the cooler 269. If the output brakes are operated in neutral as service brakes, fluid at main line pressure is delivered from the line 124 to chamber 267 of the brake coolant valve 255 upon initial movement of the brake apply valve 228 so that valve 255 starts delivering fluid to cool the output brakes 89 and 94 prior to their engagement with a regulated pressure which occurs on further movement of the brake apply valve 228, the regulated pressure for the brake engagement being determined by the amount of force applied to the brake apply valve. However, with the vehicle stationary, there is no substantial cooling requirement for the output brakes, such cooling requirements becoming substantial only when the vehicle is in motion.

Manual Control

The first forward drive by manual selection is established by the vehicle operator opening the switch 574 so that solenoid valve 329 at the neutral valve 312 is then deenergized, and closing switches 572, 575 and 578 so that the solenoid valves 490, 325 and 455 at the directional valve 461, neutral valve 312 and the manual valve 441, respectively, are energized. With the directional valve 461 now moved to its forward drive position engagement of clutch 48 is provided. At the neutral valve 312 with solenoid valve 325 now energized and thus open while solenoid valve 329 is deenergized and thus closed, pressure builds in chamber 328 to full secondary main line pressure so that the neutral valve is then moved against the bias of spring 317 to its drive-permit position in which it connects the main line 124 to the range main line 319. At the manual valve 441, with the solenoid valve 455 energized and thus open, pressure is prevented from building in chamber 451 to full secondary main line pressure and thus the manual valve is moved to its manual select position by the bias of spring 466. In the manual select position, the manual valve 441 connects the secondary main line 161 to the line 401 so that secondary main line pressure acts to hold all of the pilot valves 386, 402 and 422 in their downshift demand positions against the upshift demand bias provided by G2 pressure that is developed on motion of the vehicle. With the 3–4 pilot valve 386 in its downshift demand position connecting line 397 to exhaust port 396, the 3–4 shift valve 333 is held by spring 337 in its downshift position connecting the range main line 391 to the 2–3 shift valve feed line 341. At the 2–3 shift valve 348, full secondary main line pressure exists in chamber 361 since the 2–3 pilot valve 402 is in its downshift demand position with the solenoid valve 420 deenergized and thus closed to permit such pressure buildup. Thus the 2–3 shift valve 348 is held by full secondary main line pressure in its downshift position against the bias of spring 352 to connect the 2–3 shift valve feed line 341 to the 1–2 shift valve feed line 359. At the 1–2 shift valve 364, with the solenoid valve 382 deenergized and thus closed, pressure in chamber 381 is maintained at full secondary main line pressure to hold the 1–2 shift valve in its downshift position against the bias of spring 368 so that the 1–2 shift valve feed line 359 is connected to the line 378. Thus, fluid at main line pressure is delivered to the fluid motor 379 to engage the brake 66 which together with the engagement of clutch 48 establishes the first forward drive.

With the first forward drive thus established manually and on the operator opening the engine throttle, the vehicle will move in the forward direction by the power transmitted to the two output shafts 12 and 14. The G2 pressure in G2 line 289 increases with increasing transmission output speed and acts on all of the pilot valves 386, 402 and 422 to urge an upshift but such governor pressure bias is not normally sufficient to counteract the secondary main line pressure bias which holds all of these valves in their downshift demand position. The pilot valves will however upshift at an overspeed of 15 percent, for example, in their respective drives such as might occur on downhill coast. In the first forward drive, the G1 pressure developed in the G1 line will move the lockup shift valve 524 to its lockup position against the T.V. bias but the lockup clutch 35 is not engaged since there is fluid supply to line 538 in the first forward drive.

The second forward drive by manual selection is established by the vehicle operator maintaining the switches 572, 575 and 578 closed to thus maintain the solenoid valves 490, 325 and 455 energized and thus open, and additionally closing the switch 580 so that solenoid valve 382 is then energized and thus open. At the 1–2 shift valve 364 with the solenoid valve 382 open, pressure in chamber 381 is exhausted so that the bias of spring 368 moves the 1–2 shift valve 364 to its upshift position in which it connects the 1–2 shift valve feed line 359 to the line 372 while connecting the line 378 to the exhaust port 376. Thus, the motor 379 is exhausted to disengage the brake 66 while the motor 374 is pressurized to engage the brake 78. Since there have been no other changes in the control system the clutch 48 has remained engaged and thus the second forward drive is established. With the second forward drive thus established, the vehicle can continue to be accelerated but in a higher speed range. The lockup shift valve 524 is calibrated so that within the speed range of the second forward drive, the bias provided by G1 pressure in chamber 530 overcomes the bias provided by T.V. pressure in chamber 532 to move the lockup shift valve 524 to its lockup engage position. With the lockup shift valve 524 thus conditioned in its lockup engage position, fluid from the line 372 that is connected to operate the brake 78 is delivered sequentially through the 2–3 and 3–2 lockup timer valve 541 and 3–4 and 4–3 lockup timer valve 542 to the line 538 which is then connected to the line 533 to deliver fluid to the motor 534 to engage the lockup clutch 35. On such flow through the timer valves 541 and 542, the respective valve elements 544 and 556 will be moved, if they have not previously been moved, to the positions shown and held there by the pressure of the fluid being delivered therethrough. Whenever lockup clutch 35 is engaged, the lockup shift valve 524 which is then in its engage position delivers secondary main line pressure to line 536 and thus to the respective chambers 152 and 204 of the main pressure regulator valve 132 and converter relief valve 188 to reduce the main line pressure and converter inlet pressure during converter lockup operation.

The third forward drive by manual selection is established by the vehicle operator leaving the switches 572, 575 and 578 closed, opening the switch 580 and closing the switch 579. Thus, the solenoid valves 490, 325 and 455 at the directional valve 461, neutral valve 312, and manual valve 441 remain energized and thus open while the solenoid valve 382 at the 1–2 shift valve 364 is deenergized and thus closed and the solenoid valve 420 at the 2–3 shift valve 348 is energized and thus open. Thus, the directional valve 461 remains in its forward drive position, the neutral valve 312 remains in its drive-permit position and the manual valve 441 remains in its manual drive position. With the solenoid valve 382 thus closed, the secondary main pressure builds in chamber 381 to force the 1–2 shift valve 364 back to its downshift position connecting line 372 to the exhaust port 384 and also to exhaust port 358 so that the motor 374 is exhausted to release the brake 78. At the 2–3 shift valve 348 with the opening of the solenoid valve 420, chamber 361 is relieved of the secondary main pressure so that spring 352 then moves the 2–3 shift valve 348 to its upshift position in which it connects the 1–2 shift valve feed line 359 to the exhaust port 358 while connecting the 2–3 shift valve feed line 341 to the line 356 which is connected to them motor 357 that operates the brake 52 and is also connected to the 2–3 and 3–2 lockup timer valve 541. As the motor 357 is being filled with fluid at main pressure to engage the brake 52, the line 372 and thus the lower end of bore 546 of the 2–3 and 3–2 lockup timer valve 541 is being exhausted by the 1–2 shift valve 364. This causes downward movement of the valve element 544 which movement momentarily interrupts the feed to the lockup shift valve 524. On the shift the G1 pressure drops permitting the T.V. pressure to move the lockup shift valve 524 to its disengage position. Thus, the lockup clutch 35 is momentarily disengaged during the shift from second to the third forward drive so that the hydraulic path through the torque converter 16 is made available to cushion the shift change. With the shift completed, normal communication for the main line pressure feed to engage the lockup clutch 35 is restored with the G1 pressure increased to return the lockup shift valve 524 to its lockup position so that the lockup clutch is again engaged with full main line pressure.

Downshifting by manual selection is accomplished by reversing the sequence of operation described above. On downshifting from the third to the second forward drive, the 2–3 and 3–2 lockup timer valve 541 will momentarily interrupt feed for the engagement of the lockup clutch 35 like on the upshift from second to third forward drive since line 372 will then be pressurized while line 356 is being exhausted.

It will be recalled that in the three forward drives provided by manual selection the manual valve 441 is maintained in its manual select position in which it delivers secondary main pressure to all of the pilot valves 386, 402 and 422. This secondary main pressure aids T.V. pressure in biasing all of the pilot valves to their downshift demand positions against the upshift demand bias provided by G2 pressure. This additive secondary main pressure downshift demand bias on the pilot valves prevents these valves from moving to their upshift demand positions except at vehicle speeds beyond those normally encountered in each of the three lowest speed range drives. As a result, if manual downshifts are selected while the vehicle is operating at a speed higher than a predetermined maximum downshift speed, the G2 pressure holds engagement of the higher speed range drive until vehicle speed decreases below this maximum downshift speed. When the vehicle is operating in the third forward drive by manual selection and the vehicle operator then selects the second forward drive, the 2–3 pilot valve 402 is held in its upshift demand position by the G2 pressure in chamber 409 to connect chamber 361 of the 2–3 shift valve 348 to exhaust port 416 until the vehicle speed and thus G2 pressure is reduced to a value suitable for operation in the second forward drive whereupon the 2–3 pilot valve 402 is then moved to its downshift demand position and effects establishment of the 2–3 shift valve 348 in its downshift position since solenoid valve 420 is closed. When the vehicle is operating in the second forward drive and the operator then selects the first forward drive, the 1–2 pilot valve 422 is held in its upshift demand position to exhaust chamber 381 of the 1–2 shift valve 364 to maintain this shift valve in its upshift position until vehicle speed is reduced to a value suitable for operation in the first forward drive whereupon the 1–2 pilot valve 422 is then moved to its downshift demand position and effects establishment of the 1–2 shift valve 364 in its downshift position since solenoid valve 382 is closed.

The first reverse drive is established by the vehicle operator closing the switches 574, 575 and 578 to energize and thus open the solenoid valves 485, 325 and 455 at the directional valve 461, neutral valve 312, and manual valve 441, respectively. All other solenoid valves are deenergized and thus closed. At the directional valve 461 with the solenoid valve 485 thus open, the chamber 468 is exhausted so that the only upward or forward drive bias on this valve is provided by spring 466. The pressure feed to the chamber 482 at the opposite end of the directional valve 461 is under the control of the forward-reverse inhibitor valve 494 which is normally held by spring 499 in its shift-permit position. The forward-reverse inhibitor valve 494 is biased to its shift-prevent position by G2 pressure acting in chamber 506 and as long as vehicle speed is below the maximum speed suitable for rapid vehicle motion reversal, the forward-reverse inhibitor valve 494 remains in its shift-permit position to deliver secondary main line pressure to chamber 482 of the directional valve 461. Since solenoid valve 490 is closed, pressure builds in chamber 482 to bias the directional valve to its reverse drive position in which it connects the 1–2 shift valve feed line 359 to the line 474 so that fluid may be supplied to motor 476 to engage the clutch 50 on fluid supply to the 1–2 shift valve feed line 359. At the manual valve 441 with the solenoid valve 455 open, pressure is prevented from building in chamber 451 so that the spring 446 holds the manual valve in its manual select position. In this manual valve position the secondary main line pressure is delivered to all the pilot valves to bias them to their downshift demand positions. At the neutral valve 312 with the solenoid valve 325 open while the solenoid valve 329 is closed, pressure builds in the chamber 328 to full secondary main line pressure to move the neutral valve to its drive-permit position in which it connects the main line 124 to the range main line 319. With all of the pilot valves in their downshift demand positions, all of the shift valves are thus conditioned in their downshift positions. Thus, the 1–2 shift valve feed line 359 is supplied with main line pressure and since this line is now connected to line 474 by the directional valve 461, clutch 50 is engaged. With the 1–2 shift valve 364 in its downshift position, fluid at main line pressure is also delivered from the 1–2 shift valve feed line 359 to line 378 to thus engage the brake 66 like in the manual selection of the first forward drive previously described. Thus, both clutch 50 and brake 66 are engaged and the first reverse drive is established so that upon opening the engine throttle, the vehicle is moved in the reverse direction.

In the first reverse drive and from zero up to the maximum vehicle speed suitable for vehicle motion in reverse, G2 pressure acting in chamber 506 of the forward-reverse inhibitor valve 494 is not sufficient to overcome the bias of spring 499 so that the forward-reverse inhibitor valve remains in its shift-permit position in which it blocks connection of line 479 from the directional valve 461 to line 509 and thus chamber 481 of the latter valve. When this predetermined maximum reversal vehicle speed is exceeded, G2 pressure is sufficient to overcome the spring bias on forward-reverse inhibitor valve 494 and this valve then moves to its shift-prevent position in which it connects line 488 and thus chamber 482 of the directional valve 461 to exhaust port 510. Thus, pressure buildup is prevented in the reverse drive bias chamber 482 by the forward-reverse inhibitor valve 494 like when solenoid valve 490 is energized in the forward drive. However, at the same time, the previously blocked line 479 that is being fed by the 1–2 shift valve feed line 359 is now connected to a line 509 and thus to chamber 481 of the directional valve 461. Thus, the solenoid controlled reverse bias chamber 482 is replaced by chamber 481 whose pressurization is determined by the forward-reverse inhibitor valve 494 and neutral valve 312. In the reverse drive position of the directional valve 461, the forward drive bias chamber 468 is exhausted by this valve to exhaust port 492 and thus with the forward-reverse inhibitor valve 494 in its shift-prevent position in the first reverse drive, both solenoid valve controlled chambers 468 and 482 of the directional valve are exhausted and the reverse drive position of the directional valve 461 is maintained by a pressure signal indicative of a vehicle speed at which shifting is not desired. When vehicle speed and thus G2 pressure reduces sufficiently to permit the forward-reverse inhibitor valve 494 to be cycled by its spring 499 to its shift-permit position, shifting from the first reverse drive to forward drive is then made possible, this being normally accomplished by opening switch 574 to deenergize solenoid valve 485 while closing switch 572 to energize solenoid valve 490. With such opening of the solenoid valve 485, the normal reverse shift pressure bias on the directional valve 461 is released permitting the spring 466 to move the valve to its forward drive position. Subsequently, the then closed forward drive bias chamber 468 is pressurized by main line pressure and the valve is held in its forward position by this bias force. When in forward drive and the operator selects first reverse drive while the forward-reverse inhibitor valve 494 is in its shift-prevent position signaling too high a vehicle speed for such shifting, the reverse drive bias chamber 482 of the directional valve 461 is prevented from receiving secondary main line pressure and is instead exhausted. Thus, a shift from forward to reverse cannot then occur since the closure of solenoid valve 490 merely closes an already exhausted reverse drive bias chamber.

It will further be appreciated regarding the directional valve 461 that if, for some reason, electrical power is unavailable to both of the solenoid valves 490 and 485, they operate to close their respective chambers but with the result that there is no immediate effect on the position of the directional valve. If the directional valve 461 is then in its reverse drive position, the forward drive bias chamber 468 controlled by solenoid valve 485 is open to exhaust port 492. Thus as long as the system is pressurized, the directional valve 461 is held in its reverse drive position. This is defeated by shutting the system down to permit spring 466 to move the valve to its forward drive position. If there is power interruption to solenoid valves 490 and 485 when the directional valve 461 is in its forward drive position, the added reverse drive pressure bias is balanced by the forward drive pressure bias and the spring 466 operates to hold this position.

The second reverse drive is established by manual selection by the vehicle operator leaving the switches previously operated for first reverse drive closed and additionally closing the switch 580 so that the solenoid valve 382 is energized. At the 1–2 shift valve 364 with the solenoid valve 382 thus open, the pressure in chamber 381 is exhausted so that the spring 368 then moves this valve to its upshift position in which it disengages brake 66 and engages the brake 78. Since the directional valve 461 has remained in its reverse drive position, the clutch 50 remains engaged and now with the brake 78 engaged instead of the brake 66, the second reverse drive is thus established. In the second reverse drive the forward-reverse inhibitor valve 494 acts to prevent shifting between forward and reverse like previously described in connection with the first reverse drive.

AUTOMATIC SHIFTING OPERATION

Automatic shifting operation is established by the vehicle operator closing switches 572 and 575 to energize the solenoid valve 490 at the directional valve 461 and the solenoid valve 325 at the neutral valve 312, respectively, all other solenoid valves being deenergized and thus closed. At the directional valve 461 with the thus opened solenoid valve 490, pressure is thus prevented from building in chamber 482 so that the directional valve is positioned in its forward drive position to establish engagement of the clutch 48 as described previously in the first forward drive in manual operation. Like in the first forward manual drive, the forward-reverse inhibitor valve 494 is in its shift-permit position for permitting subsequent pressurization of chamber 482 while exhausting chamber 481 of the directional valve 461. At the neutral valve 312 with the solenoid valve 325 opened, pressure is prevented from building in chamber 318 while pressure builds in the opposite chamber 328 to full secondary main line pressure to position the neutral valve in its drive position in which it delivers main line pressure to the 3–4 shift valve 333. Since the solenoid valve 455 at the manual valve 441 is closed, the pressure in chamber 451 builds to full secondary main line pressure to hold the manual valve 441 in its cutoff position preventing delivery of the secondary main line pressure to bias the pilot valves as occurred in the manual shifting operation previously described. With no G2 pressure and the lowest T.V. pressure, all of the pilot valves 386, 402 and 422 are biased to their downshift demand positions.

Since the 3–4 pilot valve 386 is in its downshift demand position, the chamber 346 of the 3–4 shift valve 333 is exhausted so that this shift valve is spring biased to its downshift position connecting the range main line 319 to the 2–3 shift valve feed line 341. Since the 2–3 pilot valve 402 is in its downshift demand position, the chamber 361 of the 2–3 shift valve 348 is provided with full secondary main line pressure so that the 2–3 shift valve 348 is held against its spring bias in its downshift position in which it connects the 2–3 shift valve feed line 341 to the 1–2 shift valve feed line 359. Since the 1–2 pilot valve is in its downshift demand position, the chamber 381 of the 1–2 shift valve 364 is provided with full secondary main line pressure so that the 1–2 shift valve 364 is held against its spring bias in its downshift position in which it connects the 1–2 shift valve feed line 359 to engage brake 66. Thus, both clutch 48 and brake 66 are engaged to establish the first forward drive. Then, when the vehicle is accelerated and vehicle speed is sufficient to require the second forward drive and engine torque demand is sufficiently low to permit the second forward drive, the G2 pressure upshift bias overcomes the T.V. downshift pressure bias to condition the 1–2 pilot valve 422 in its upshift demand position. In the upshift demand position, the 1–2 pilot valve 422 exhausts chamber 381 of the 1–2 shift valve 364 so that the latter valve's spring bias then conditions the 1–2 shift valve 364 in its upshift position disengaging the brake 66 and engaging the brake 78 while clutch 48 remains engaged to thus automatically establish the second forward drive. As described previously, the engagement of the lockup clutch 35 provided by the operation of the lockup shift valve 524 is such that converter lockup clutch engagement occurs in all drives above the first forward drive. Thus, engagement of the lockup clutch 35 does not occur during automatic first forward drive operation.

In the second forward drive as the vehicle continues to accelerate and when vehicle speed is sufficient to require the third forward drive while the engine torque demand is sufficiently low enough to permit the third forward drive, the G2 pressure bias overcomes the T.V. pressure bias acting on the 2–3 pilot valve 402 so that this valve is then conditioned in its upshift demand position in which it exhausts the chamber 361 of the 2–3 shift valve 348. The 2–3 shift valve 348 is then biased by its spring 352 to its upshift position in which it exhausts the downstream 1–2 shift valve feed line 359 to thus disengage the brake 78 while connecting the 2–3 shift valve feed line 341 to line 356 to engage the brake 52 while clutch 48 remains engaged by directional valve 461 and thus establish the third forward drive. During operation in the second forward drive, the lockup shift valve 524 is biased by G1 pressure developed in the speed range of this drive to its lockup engage position to effect engagement of the lockup clutch 35 by delivery of fluid pressure to line 533 from the line 372 via timer valves 541 and 542 and the line 538. Then on the automatic shift from the second to the third forward drive, the 2–3 and 3–2 lockup timer valve 541 and lockup shift valve 524 operate like on the manual upshift previously described to momentarily disengage the lockup clutch 35 on the shift, the lockup clutch then being engaged by fluid delivered from the line 356 which is feeding fluid for the engagement of brake 52.

In the third forward drive as the vehicle continues to be accelerated and when vehicle speed is sufficient to require the fourth forward drive while the torque demand on the engine is low enough to permit fourth forward drive, the G2 pressure bias acting on the 3–4 pilot valve 386 is sufficient to overcome the oppositely acting T.V. pressure bias to condition this valve in its upshift demand position. The 3–4 pilot valve 386 in its upshift demand position connects the secondary main line 161 to the line 397 so that chamber 346 of the 3–4 shift valve 333 is then pressurized to full secondary main line pressure resulting in movement of this shift valve to its upshift position. The 3–4 shift valve 333 in its upshift position connects the 2–3 shift valve feed line 341 to exhaust and thus effects disengagement of the brake 52 while connecting the range main line 319 to line 344 which is in turn connected by the directional valve 461 in its forward drive position to line 474 to engage the clutch 50 whose engagement together with that of clutch 48 establishes the fourth forward drive.

On the automatic shift from the third to the fourth forward drive, the main line pressure delivered to engage clutch 50 is also delivered by line 344 to the 3–4 and 4–3 lockup timer valve 542 and with line 554 being exhausted through the 2–3 and 3–2 lockup timer valve 541 since line 356 is being exhausted to disengage brake 52, the lockup timer valve element 556 moves from the position shown downward to momentarily interrupt the maintenance of main line fluid pressure in line 538 to the lockup shift valve 524. Furthermore, the G1 pressure drops during the shift so that the lockup shift valve 524 is momentarily moved to its disengage position. Thus, on the shift from third to the fourth forward drive the lockup clutch 35 is momentarily disengaged like on the shift from the second to the third forward drive.

Downshifting through all the forward drives by automatic operation is similar to upshifting but occurs in reverse sequence. In upshifts, the 1–2 pilot valve 422 and 2–3 pilot valve 402 sequentially exhaust the chambers 381 and 361 of the 1–2 shift valve 364 and 2–3 shift valve 348, respectively, and then the 3–4 pilot valve 386 effects pressurization of chamber 346 of the 3–4 shift valve 333. In downshifts, the 3–4 pilot valve 386 exhausts chamber 346 of the 3–4 shift valve 333 to shift from the fourth to the third forward drive, the 2–3 pilot valve 402 then effects pressurization of chamber 361 on the 2–3 shift valve 348 to shift from the third to the second forward drive and finally the 1–2 pilot valve 422 effects pressurization of chamber 381 of the 1–2 shift valve 364 to shift from the second to the first forward drive, such downshifting occurring when the T.V. pressure biases sequentially overcome the G2 pressure biases on the respective pilot valves. Furthermore, the lockup timer valves 542 and 541 also operate in reverse order to effect momentary interruption of the engagement of the lockup clutch 35 with the 3–4 and 4–3 lockup timer valve 542 effecting such interruption on downshifting from the fourth to the third forward drive and the 2–3 and 3–2 lockup timer valve 541 effecting such operation on downshifting from the third to the second forward drive, there being no lockup clutch interruption on a downshift from the second to the first forward drive since the lockup shift valve 524 disengages the lockup clutch 35 in the second forward drive on sufficient speed reduction.

During all of the above-described shifting between the forward drives and also on shifting from neutral to forward drive, the priority valve 516 operates to maintain sufficient pressure for continued engagement of clutch 48. For example, on shifting from the first to the second forward drive, fluid is delivered through the range main line 319 to fill motor 374 to engage brake 78. When there is sufficient flow to motor 374 to maintain sufficient pressure at the motor 472 for continued engagement of clutch 48, this pressure is also effective to open priority valve 516 so that flow is through branch 521 of the range main line 319. Alternatively, if the flow required to effect engagement of brake 78 is large enough to cause a substantial pressure drop upstream of flow restriction 522 tending to release engagement of clutch 48, the reduced pressure upstream of this flow restriction permits spring 519 to close priority valve 516 so that flow to engage brake 78 is all through flow restriction 522 thereby limiting this pressure to maintain all upstream pressures. Then when sufficient flow has occurred to fill the circuit downstream of flow restriction 522, pressure begins to build throughout this circuit to full main line pressure and the priority valve 516 will be restored to its normal open position.

Further regarding the neutral valve 312 which controls the fluid delivery to all of the shift valves, it will be recalled that this valve is spring loaded to its neutral position and that solenoid valve controlled pressure chambers 318 and 328 at each end control its movement. When the operator selects neutral and on engine startup, it will be further recalled that the chamber 328 is exhausted. Thus, if for some reason the solenoid valves 325 and 329 do not operate and thus close their respective chambers, the spring 317 acts to hold the valve in its neutral position. In normal operation, any shift from neutral causes the solenoid valve 325 to open while the other solenoid valve 329 remains closed. This evacuates the chamber 318 and pressurizes the chamber 328 and since the pressure bias is greater than the spring bias, the valve moves to effect drive establishment. On such valve movement, the chamber 318 controlled by solenoid valve 325 is then connected to exhaust port 331 so that on subsequent lack of electrical power to the solenoid valve 325 this solenoid valve closes on an already evacuated chamber with the result that the valve remains in its engage position. On an interruption of secondary main line pressure supply to neutral valve 312, the spring 317 returns the valve to its neutral position. For push starting the vehicle's engine, the neutral valve 312 may be manually held by pin 332 in its engage position against its spring bias. Following engine starting the neutral valve 312 will remain engaged.

In all of the drives, the brake apply valve 228 may be operated by the vehicle operator to engage the output brakes to brake the transmission's output shafts 12 and 14. In the first and second forward drives, the 1-2 shift valve feed line 359 receives main line pressure and this pressure is transmitted to act on valve element 209 of the push start-diverter valve 208 to condition this valve in its push start position against the oppositely acting supercharge pressure bias so that all of the fluid from the output pump 121 is only made available to the main line 124 to provide for push starting the engine. Thus, when the vehicle output brakes are engaged in the first and second forward drives, only the overage fluid from the converter relief valve 188 via line 202 and the fluid in the converter return line 207 is made available to the brake coolant valve 255 which delivers this fluid to cool the output brakes during their engagement. In the third forward drive and also in the fourth forward drive, the 1-2 shift valve feed line 359 is exhausted and thus the push start-diverter valve 208 receives no valve closing pressure bias so that it is then opened against its spring bias by normal supercharge pressure bias to deliver fluid direct from the output pump 121 via line 207 to brake coolant valve 255 to aid in cooling the brakes when they are engaged during either third or fourth forward drive.

The above described embodiment is illustrative of the invention which may be modified within the scope of the appended claims.

I claim:

1. In a control system for a transmission providing a plurality of different speed range drives the combination of a plurality of fluid pressure operated drive engaging means each operable on fluid pressure delivery thereto to effect establishment of a drive, a fluid pressure source, throttle pressure valve means operatively connected to said fluid pressure source for providing a throttle pressure that changes with transmission torque demand, governor means operatively connected to said fluid pressure source for providing a governor pressure that changes with transmission output speed, shift valve means conditionable to operatively connect said fluid pressure source to each of said drive engaging means, pilot valve means responsive to both said governor pressure and said throttle pressure to control fluid pressure from said fluid pressure source to act on and condition each said shift valve means to automatically establish drive according to output speed and torque demand, and manually controlled electrically operated valve means for controlling fluid pressure from said fluid pressure source to act on and condition each said shift valve means to establish drive irrespective of torque demand.

2. In a control system for a transmission providing a plurality of different speed range drives the combination of a plurality of fluid pressure operated drive engaging means each operable on fluid pressure delivery thereto to effect establishment of a drive, a fluid pressure source, throttle pressure valve means operatively connected to said fluid pressure source for providing a throttle pressure that changes with transmission torque demand, governor means operatively connected to said fluid pressure source for providing a governor pressure that changes with transmission output speed, shift valve means conditionable to operatively connect said fluid pressure source to each of said drive engaging means, pilot valve means responsive to both said governor pressure and said throttle pressure to control fluid pressure from said fluid pressure source to act on and condition each said shift valve means to automatically establish drive according to output speed and torque demand, and manually controlled electrically operated valve means for controlling fluid pressure from said fluid pressure source to act on and condition each said shift valve means to establish drive irrespective of torque demand with automatic downshifting by said shift valve means under control of said pilot valve means according to output speed from a higher speed range drive to a manually selected drive above a predetermined output speed in the higher speed range drive.

3. In a control system for a transmission providing a plurality of different speed range drives the combination of a plurality of fluid pressure operated drive engaging means each operable on fluid pressure delivery thereto to effect establishment of a drive, a fluid pressure source, throttle pressure valve means operatively connected to said fluid pressure source for providing a throttle pressure that changes with transmission torque demand, governor means operatively connected to said fluid source for providing a governor pressure that changes with transmission output speed, shift valve means conditionable to operatively connect said fluid pressure source to each of said drive engaging means, pilot valve means responsive to both said governor pressure and said throttle pressure to control fluid pressure from said fluid pressure source to act on and condition each said shift valve means to automatically establish drive according to output speed and torque demand, manually controlled electrically operated valve means for controlling fluid pressure from said fluid pressure source to act on and condition each said shift valve means to establish drive irrespective of torque demand and said pilot valve means including means responsive to fluid pressure from said fluid pressure source for preventing said shift valve means from effecting a shift from a manually selected drive to a higher speed range drive.

4. In a control system for a transmission providing a plurality of different speed range drives the combination of a plurality of fluid pressure operated drive engaging means each operable on fluid pressure delivery thereto to effect establishment of a drive, a fluid pressure source, throttle pressure valve means operatively connected to said fluid pressure source for providing a throttle pressure that changes with transmission torque demand, governor means operatively connected to said fluid pressure source for providing a governor pressure that changes with transmission output speed, shift valve means conditionable to operatively connect said fluid pressure source to each of said drive engaging means, pilot valve means responsive to both said governor pressure and said throttle pressure to control fluid pressure from said fluid pressure source to act on and condition each said shift valve means to automatically establish drive according to output speed and torque demand, manually controlled electrically operated valve means for controlling fluid pressure from said fluid pressure source to act on and condition each said shift valve means to establish drive irrespective of torque demand, neutral valve means for selectively preventing and permitting drive shifting by said shift valve means by controlling connection between said fluid pressure source and said shift valve means, and manually controlled electrically operated valve means for controlling fluid pressure from said fluid pressure source to act on and condition said neutral valve means to selectively prevent and permit drive shifting by said shift valve means and on electric power interruption maintaining the then-existing neutral valve condition.

5. In a control system for a transmission providing a plurality of different forward speed range drives and at least one reverse drive, the combination of a plurality of fluid pressure operated drive engaging means operable on selective fluid pressure delivery thereto to effect establishment of forward drives and a reverse drive, a fluid pressure source, throttle pressure valve means operatively connected to said fluid pressure source for providing a throttle pressure that changes with transmission torque demand, governor means operatively connected to said fluid pressure source for providing a governor pressure that changes with transmission output speed, directional valve means, shift valve means, said directional valve means and said shift valve means conditionable to operatively connect said fluid pressure source to said drive engaging means to establish the drives, pilot valve means responsive to both said governor pressure and said throttle pressure to control fluid pressure from said fluid pressure source to act on and condition each said shift valve means to automatically establish forward drive according to output speed and torque demand, manually controlled electrically operated valve means for controlling fluid pressure from said fluid pressure source to act on and condition each said shift valve means to manually select forward drive irrespective of torque demand neutral valve means for selectively preventing and permitting drive shifting by said shift valve means by controlling connection between said fluid pressure source and said shift valve means, manually controlled electrically operated valve means for controlling fluid pressure from said fluid pressure source to act on and condition said neutral valve means to selectively prevent and permit forward drive shifting by said shift valve means and on electrical power interruption during drive maintaining the then-existing neutral valve drive permitted condition, and manually controlled electrically operated valve means for controlling fluid pressure from said fluid pressure source to act on and condition said directional valve means to selectively establish forward and reverse drive and on electrical power interruption during either forward or reverse drive maintaining the then-existing drive.

6. In a control system for a transmission providing a plurality of different speed range drives the combination of a plurality of fluid pressure operated drive engaging means each operable on fluid pressure delivery thereto to effect establishment of a drive, an input pump providing a fluid pressure source, an output pump providing another fluid pressure source, throttle pressure valve means operatively connected to said fluid pressure sources for providing a throttle pressure that changes with transmission torque demand, governor means operatively connected to said fluid pressure sources for providing a governor pressure that changes with transmission output speed, shift valve means conditionable to deliver fluid pressure from both said sources to each of said drive engaging means, pilot valve means responsive to both said governor pressure and said throttle pressure to control fluid pressure from both said sources to act on and condition each said shift valve means to automatically establish drive according to output speed and torque demand, manually controlled electrically operated valve means for controlling fluid pressure from both said sources to act on and condition each said shift valve means to establish drive, transmission output brake means, and means controlled by the fluid pressure delivered to one of said drive engaging means and also fluid pressure from said input pump for positively diverting fluid from said output pump to cool said transmission output brake means in at least the highest speed range drive provided by the automatic and manual selection.

7. In a control system for a transmission providing a plurality of different forward speed range drives and at least two reverse drives the combination of a plurality of fluid pressure operated drive engaging means each operable on fluid pressure delivery thereto to effect establishment of a drive, throttle pressure valve means operatively connected to said fluid pressure sources for providing a throttle pressure that changes with transmission torque demand, governor means operatively connected to said fluid pressure source for providing a governor pressure that changes with transmission output speed, directional valve means, shift valve means, said directional valve means and said shift valve means conditionable to operatively connect said fluid pressure source to said drive engaging means to establish the drives, pilot valve means responsive to both said governor pressure and said throttle pressure to control fluid pressure from said fluid pressure source to act on and condition said shift valve means to automatically establish forward drives according to output speed and torque demand, manually controlled electrically operated valve means for controlling fluid pressure from said fluid pressure source to act on and condition each said shift valve means to manually select forward drive irrespective of torque demand, neutral valve means for selectively preventing and permitting drive shifting by said shift valve means by controlling connection between said fluid pressure source and said shift valve means, manually controlled electrically operated valve means for controlling fluid pressure from said fluid pressure source to act on and condition said neutral valve means to selectively prevent and permit forward drive shifting by said shift valve means and on electric power interruption maintaining the then-existing neutral valve condition, manual valve means for controlling fluid pressure from said fluid pressure source to act on and condition said pilot valve means to prevent upshift operation after downshift operation during manually selected drive operation, manually controlled electrically operated valve means for controlling fluid pressure from said fluid pressure source to act on and condition said directional valve means to shift between forward and reverse drive and also between the reverse drives and on electric power interruption maintaining the then-existing drive in either forward or reverse and inhibitor valve means responsive to said governor pressure for controlling fluid pressure from said fluid pressure source to act on and condition said directional valve means to prevent shifting between forward drive and reverse drive above a predetermined output speed.

8. In a control system for a transmission providing a plurality of different speed range drives the combination of a plurality of fluid pressure operated drive engaging means each operable on fluid pressure delivery thereto to effect establishment of a drive, a fluid pressure source, throttle pressure regulator valve means operatively connected to said fluid pressure source for providing a throttle pressure increasing with increasing transmission torque demand, governor means operatively connected to said fluid pressure source for providing a governor pressure increasing with increasing transmission output speed, shift valve means operatively connected to each of said drive engaging means, all of said shift valve means operatively connected in series to said fluid pressure source, the furthest downstream shift valve means operable in a downshift position to establish fluid delivery to the drive engaging means that establishes the lowest speed range drive and in an upshift position to exhaust fluid from the last-mentioned drive engaging means while establishing fluid delivery to the drive engaging means that establishes the next higher speed range drive, each of the other of said shift valve means operable in a downshift position to establish fluid delivery to the immediate downstream shift valve means and in an upshift position to exhaust fluid from the immediate downstream shift valve means while establishing fluid delivery to the connected drive engaging means, spring means for normally biasing each of said shift valve means to one of said shift positions, means for delivering fluid pressure from said fluid pressure source to bias each of said shift valve means to the other of said shift positions, pilot valve means corresponding to each of said shift valve means and responsive to both said throttle pressure and governor pressure for controlling the pressure bias on the associated shift valve means to effect sequential upshifting and downshifting of the drives in accordance with torque demand and output speed and manually controlled electrically operated valve means corresponding to each of said shift valve means for relieving the fluid pressure bias on the associated shift valve means to select drive.

9. In a control system for a transmission providing a plurality of different speed range drives the combination of a plurality of fluid pressure operated drive engaging means each operable on fluid pressure delivery thereto to effect establishment of a drive, a fluid pressure source, throttle pressure regulator valve means operatively connected to said fluid pressure source for providing a throttle pressure increasing with increasing transmission torque demand, governor means operatively connected to said fluid pressure source for providing a governor pressure increasing with increasing transmission output speed, shift valve means operatively connected to each of said drive engaging means, all of said shift valve means operatively connected in series to said fluid pressure source, the furthest downstream shift valve means operable in a downshift position to establish fluid delivery to the drive engaging means that establishes the lowest speed range drive and in an upshift position to exhaust fluid from the last-mentioned drive engaging means while establishing fluid delivery to the drive engaging means that establishes the next higher speed range drive, each of the other of said shift valve means operable in a downshift position to establish fluid delivery to the immediate downstream shift valve means and in an upshift position to exhaust fluid from the immediate downstream shift valve means while establishing fluid delivery to the connected drive engaging means, spring means for normally biasing each said shift valve means to one of said shift positions, manually controlled electrically operated valve means for delivering fluid pressure from said fluid pressure source to bias each of said shift valve means to the other of said shift positions, pilot valve means corresponding to each of said shift valve means and responsive to both said throttle pressure and governor pressure for controlling the pressure bias on the associated shift valve means to effect sequential upshifting and downshifting of the drives in accordance with torque demand and output speed, manually controlled electrically operated valve means corresponding to each of the shift valve means for relieving the fluid pressure bias on the associated shift valve means to select drive, manually controlled electrically operated manual valve means for selectively delivering fluid pressure during manual shifting from said fluid pressure source to all of said pilot valve means and each of said pilot valve means including pressure responsive means responsive to the pressure delivered by said manual valve means to prevent said shift valve means for effecting a shift from a manually selected drive to a higher speed range drive.

10. In a control system for a transmission providing a plurality of different speed range drives the combination of a plurality of fluid pressure operated drive engaging means each operable on fluid pressure delivery thereto to effect establishment of a drive, a fluid pressure source, throttle pressure regulator valve means operatively connected to said fluid pressure source for providing a throttle pressure increasing with increasing transmission torque demand, governor means operatively connected to said fluid pressure source for providing a governor pressure increasing with increasing transmission output speed, shift valve means operatively connected to each of said drive engaging means, all of said shift valve means operatively connected in series to said fluid pressure source, the furthest downstream shift valve means operable in a downshift position to establish fluid delivery to the drive engaging means that establishes the lowest speed range drive and in an upshift position, to exhaust fluid from the last-mentioned drive engaging means while establishing fluid delivery to the drive engaging means that establishes the next higher speed range drive, each of the other of said shift valve means operable in a downshift position to establish fluid pressure delivery to the immediate downstream shift valve means and in an upshift position to exhaust fluid from the immediate downstream shift valve means while establishing fluid delivery to the connected drive engaging means, means normally biasing each of said shift valve means to one of the shift positions, each of said shift valve means having pressure responsive means responsive to fluid pressure to bias the shift valve means to the other shift position, pilot valve means corresponding to each of said shift valve means and responsive to both said throttle pressure and governor pressure for delivering fluid pressure from said fluid pressure source to the pressure responsive means of the associated shift valve means to bias the associated shift valve means from said one position to said other position to effect sequential upshifting and downshifting of the drives in accordance with torque demand and output speed and manually controlled electrically operated valve means corresponding to each of said shift valve means for relieving the fluid pressure on the associated shift valve means to condition the associated shift valve means in said one position.

11. In a control system for a transmission providing a plurality of different speed range drives the combination of a plurality of fluid pressure operated drive engaging means each operable on fluid pressure delivery thereto to effect establishment of a drive, a fluid pressure source, throttle pressure regulator valve means operatively connected to said fluid pressure source for providing a throttle pressure increasing with increasing transmission torque demand, governor means operatively connected to said fluid pressure source for providing a governor pressure increasing with increasing transmission output speed, shift valve means operatively connected to each of said drive engaging means and to said fluid pressure source, each of said shift valve means operable in a downshift position to establish fluid delivery to the connected drive engaging means and in an upshift position to exhaust fluid from the connected drive engaging means, means for normally biasing each said shift valve means to one of said shift positions, means for delivering fluid pressure to act on each of said shift valve means to urge said shift valve means to the other shift position, pilot valve means corresponding to each of said shift valve means and responsive to both said throttle pressure and governor pressure for relieving the pressure bias on the associated shift valve means in accordance with torque demand and output speed to effect sequential upshifting and downshifting of the drives, manually controlled electrically operated valve means corresponding to each of said shift valve means for relieving the fluid pressure bias on the associated shift valve means regardless of the operation of the associated pilot valve means to control the associated shift valve means to select drive and manual valve means operatively connected to said fluid pressure source for selectively delivering a downshift demand pressure to all of said pilot valve means,.

12. In a control system for a transmission providing a plurality of different speed range drives the combination of a plurality of fluid pressure operated drive engaging means each operable on fluid pressure delivery thereto to effect establishment of a drive, a fluid pressure source, throttle pressure regulator valve means operatively connected to said fluid pressure source for providing a throttle pressure increasing with increasing transmission torque demand, governor means operatively connected to said fluid pressure source for providing a governor pressure increasing with increasing transmission output speed, shift valve means operatively connected to each of said drive engaging means, all of said shift valve means operatively connected in series to said fluid pressure source, the furthest downstream shift valve means operable in a downshift position to establish fluid delivery to the drive engaging means that establishes the lowest speed range and in an upshift position to exhaust fluid from the last-mentioned drive engaging means while establishing delivery of fluid to the drive engaging means that establishes the next higher speed range drive, each of the other of said shift valve means operable in a downshift position to establish fluid delivery to the immediate downstream shift valve means and in an upshift position to exhaust fluid from the immediate downstream shift valve means while establishing fluid delivery to the connected drive engaging means, means for normally biasing each said shift valve means to one of said shift positions, means for delivering fluid pressure to act on each of said shift valve means to urge said shift valve means to the other shift position, pilot valve means corresponding to each of said shift valve means and responsive to both said throttle pressure and governor pressure for relieving the pressure bias on the associated shift valve means in accordance with torque demand and output speed to effect sequential upshifting and downshifting of the drives, manually controlled electrically operated valve means corresponding to each of said shift valve means for relieving the fluid pressure bias on the associated shift valve means regardless of the operation of the associated pilot valve means to control the associated shift valve means to select drive, manual valve means operatively connected to said fluid pressure source for selectively delivering a downshift demand pressure to all of said pilot valve means, biasing means normally biasing said manual valve means to a downshift demand pressure delivery position, means normally delivering fluid pressure from said fluid pressure source to bias said manual valve means to a position preventing downshift demand pressure delivery, manually controlled electrically operated valve means for relieving the fluid pressure bias on said manual valve means to establish downshift demand pressure delivery to said pilot valve means and each said pilot valve means having means responsive to said downshift demand pressure from said manual valve means to condition the pilot valve means to demand the downshift position of the associated shift valve means.

13. In a control system for a transmission providing a plurality of different speed range drives including both forward and reverse drive the combination of a plurality of fluid pressure operated drive engaging means each operable on fluid pressure delivery thereto to effect establishment of a drive, a fluid pressure source, throttle pressure regulator valve means operatively connected to said fluid pressure source for providing a throttle pressure increasing with increasing transmission torque demand, governor means operatively connected to said fluid pressure source for providing a governor pressure increasing with increasing transmission output speed, shift valve means operatively connected to each of said drive engaging means and to said fluid pressure source, each of said shift valve means operable in a downshift position to establish fluid delivery to the connected drive engaging means and in an upshift position to exhaust fluid from the connected drive engaging means, directional valve means for cooperating with said furthest downstream shift valve means to selectively deliver fluid to one of two of said drive engaging means to effect in a forward drive position establishment of all of the forward drives and in a reverse drive position establishment of reverse drive, spring means normally biasing said directional valve means to said forward drive position, said directional valve means having pressure responsive means responsive to a forward bias pressure derived from said fluid pressure source only in said forward drive position to urge said directional valve means to said forward drive position, manually controlled electrically operated valve means for relieving any forward bias pressure acting to urge said directional valve means to said forward drive position, forward-reverse inhibitor valve means, spring means for normally biasing and forward-reverse inhibitor valve means to a shift permit position to deliver a first reverse bias pressure derived from said fluid pressure source to said directional valve means, said forward-reverse inhibitor valve means having pressure responsive means responsive to said governor pressure for urging said forward-reverse inhibitor valve means to a shift inhibit position preventing delivery of said first reverse bias pressure to said directional valve means while providing for delivery to said directional valve means of a second reverse bias pressure derived from the fluid delivered by said directional valve means to establish reverse drive, said directional valve means having means responsive to said second reverse bias pressure to urge said directional valve means to said forward position and manually controlled electrically operated valve means for relieving said first reverse bias pressure on said directional valve means.

14. In a control system for a transmission providing a plurality of different speed drives including both forward and reverse drive the combination of a plurality of fluid pressure operated drive engaging means each operable on fluid pressure delivery thereto to effect establishment of a drive, a fluid pressure source, throttle pressure regulator valve means operatively connected to said fluid pressure source for providing a throttle pressure increasing with increasing transmission torque demand, governor means operatively connected to said fluid pressure source for providing a governor pressure increasing with increasing transmission output speed, shift valve means operatively connected to each of said drive engaging means, all of said shift valve means operatively connected in series to said fluid pressure source, the furthest downstream shift valve means operable in a downshift position to establish fluid delivery to the drive engaging means that establishes the lowest speed range drive and in an upshift position to exhaust fluid from the last-mentioned drive engaging means while establishing fluid pressure delivery to the drive engaging means that establishes the next higher speed range drive, each of the other of said shift valve means operable in a downshift position to establish fluid delivery to the immediate downstream shift valve means and in an upshift position to exhaust fluid from the immediate downstream shift valve means while establishing fluid delivery to the connected drive engaging means, directional valve means for cooperating with said furthest downstream shift valve means to selectively deliver fluid to one of two of said drive engaging means to effect in a forward drive position establishment of all of the forward drives and in a reverse drive position establishment of reverse drive, spring means normally biasing said directional valve means to said forward drive position, said directional valve means having pressure responsive means responsive to a forward bias pressure derived from said fluid pressure source only in said forward drive position to urge said directional valve means to said forward drive position, manually controlled electrically operated valve means for relieving any forward bias pressure acting to urge said directional valve means to said forward drive position, forward-reverse inhibitor valve means, spring means for normally biasing said forward-reverse inhibitor valve means to a shift permit position to deliver a first reverse bias pressure derived from said fluid pressure source to said directional valve means, said forward-reverse inhibitor valve means having pressure responsive means responsive to said governor pressure for urging said forward-reverse inhibitor valve means to a shift inhibit position preventing delivery of said first reverse bias pressure to said directional valve means while providing for delivery to said directional valve means of a second reverse bias pressure derived from the fluid delivered by said directional valve means to establish reverse drive, said directional valve means having means responsive to said second reverse bias pressure to urge said directional valve means to said forward position and manually controlled electrically operated valve means for relieving said first reverse bias pressure on said directional valve means.

15. In a control system for a transmission providing a plurality of different speed range drives including both forward and reverse drive the combination of a plurality of fluid pressure operated drive engaging means each operable on fluid pressure delivery thereto to effect establishment of a drive, a fluid pressure source, throttle pressure regulator valve means operatively connected to said fluid pressure source for providing a throttle pressure increasing with increasing transmission torque demand, governor means operatively connected to said fluid pressure source for providing a governor pressure increasing with increasing transmission output speed, shift valve means operatively connected to each of said drive engaging means, all of said shift valve means operatively connected in series to said fluid pressure source, the furthest downstream shift valve means operable in a downshift position to establish fluid delivery to the drive engaging means that establishes the lowest speed range drive and in an upshift position to exhaust fluid from the last-mentioned drive engaging means while establishing fluid pressure delivery to the drive engaging means that establishes the next higher speed range drive, each of the other of said shift valve means operable in a downshift position to establish fluid delivery to the immediate downstream shift valve means and in an upshift position to exhaust fluid from the immediate downstream shift valve means while establishing fluid delivery to the connected drive engaging means, directional valve means for cooperating with said furthest downstream shift valve means to selectively deliver fluid to one of two of said drive engaging means to effect in a forward drive position establishment of all of the forward drives and in a reverse drive position establishment of reverse drive, neutral valve means, spring means for normally biasing said neutral valve means to a neutral position preventing fluid delivery from said fluid pressure source to said shift valve means and said directional valve means to prevent establishment of drive in either forward or reverse, said neutral valve means having pressure responsive means acted on by fluid pressure from said fluid pressure source to bias said neutral valve means to a drive position providing fluid delivery to said shift valve means and said directional valve means, manually controlled electrically operated valve means for relieving any fluid pressure urging said neutral valve means to said drive position, said neutral valve means having pressure responsive means responsive to fluid pressure from said fluid pressure source only when said neutral valve means is in said neutral position to urge said neutral valve to said neutral position, manually controlled electrically operated valve means for relieving any fluid pressure acting to urge said neutral valve means to said neutral position, means for relieving pressure acting to urge said neutral valve means to said neutral position when said neutral valve means is in said drive position, spring means normally biasing said directional valve means to said forward drive position, said directional valve means having pressure responsive means responsive to a forward bias pressure derived from said fluid pressure source only in said forward drive position to urge said directional valve means to said forward drive position, manually controlled electrically operated valve means for relieving any forward bias pressure acting to urge said directional valve means to said forward drive position, forward-reverse inhibitor valve means, spring means for normally biasing said forward-reverse inhibitor valve means to a shift permit position to deliver a first reverse bias pressure derived from said fluid pressure source to said directional valve means, said forward-reverse inhibitor valve means having pressure responsive means responsive to said governor pressure for urging said forward-reverse inhibitor valve means to a shift inhibit position preventing delivery of said first reverse bias pressure to said directional valve means while providing for delivery to said directional valve means of a second reverse bias pressure derived from the fluid delivered by said directional valve means to establish reverse drive, said directional valve means having means responsive to said second reverse bias pressure to urge said directional valve means to said forward position and manually controlled electrically operated valve means for relieving said first reverse bias pressure on said directional valve means.

* * * * *